United States Patent
Hanna et al.

(10) Patent No.: US 9,637,560 B2
(45) Date of Patent: May 2, 2017

(54) METHOD FOR THE PRODUCTION OF SUBSTITUTED POLYSACCHARIDES VIA REACTIVE EXTRUSION

(75) Inventors: Milford Hanna, Lincoln, NE (US); Pratik Bhandari, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 516 days.

(21) Appl. No.: 13/884,336

(22) PCT Filed: Nov. 8, 2011

(86) PCT No.: PCT/US2011/059785
§ 371 (c)(1),
(2), (4) Date: Jul. 26, 2013

(87) PCT Pub. No.: WO2012/064741
PCT Pub. Date: May 18, 2012

(65) Prior Publication Data
US 2013/0296543 A1    Nov. 7, 2013

Related U.S. Application Data

(60) Provisional application No. 61/411,521, filed on Nov. 9, 2010, provisional application No. 61/411,992, filed on Nov. 10, 2010, provisional application No. 61/472,748, filed on Apr. 7, 2011.

(51) Int. Cl.
| | |
|---|---|
| *C08B 30/12* | (2006.01) |
| *C08B 31/00* | (2006.01) |
| *C08B 31/02* | (2006.01) |
| *C08B 3/06* | (2006.01) |
| *C08B 11/12* | (2006.01) |
| *C08B 31/04* | (2006.01) |
| *C08B 31/12* | (2006.01) |
| *C08B 15/02* | (2006.01) |
| *C08B 37/00* | (2006.01) |

(52) U.S. Cl.
CPC ............ *C08B 31/00* (2013.01); *C08B 3/06* (2013.01); *C08B 11/12* (2013.01); *C08B 15/02* (2013.01); *C08B 31/04* (2013.01); *C08B 31/12* (2013.01); *C08B 37/00* (2013.01)

(58) Field of Classification Search
CPC .......... C08B 30/12; C08B 31/00; C08B 31/02

USPC ............. 536/124, 56, 58, 63, 102, 107, 115; 106/206.1, 207.1
See application file for complete search history.

(56) References Cited

U.S. PATENT DOCUMENTS

| | | |
|---|---|---|
| 6,765,042 B1 | 7/2004 | Thornton et al. |
| 7,541,396 B2 | 6/2009 | Luo et al. |
| 2003/0141637 A1 | 7/2003 | Kesselmans et al. |
| 2005/0214541 A1 | 9/2005 | Berrada et al. |
| 2007/0179291 A1 | 8/2007 | Thibodeau et al. |
| 2008/0177057 A1 | 7/2008 | Bolduc et al. |
| 2009/0088565 A1 | 4/2009 | Schick et al. |

FOREIGN PATENT DOCUMENTS

WO     2010096742 A2     8/2010

OTHER PUBLICATIONS

Biswas et al., "Iodine-Catalyzed Esterification of Polysaccharides", Chemistry Today, Jul.-Aug. 2009, pp. 33-35, vol. 27, No. 4, retrieved from the internet on Feb. 29, 2012, <URL: http://ddr.nal.usda.gov/handle/10113/49492>.

Biswas et al., "Rapid and Environmentally Friendly Preparation of Starch Esters", Carbohydrate Polymers, Jun. 13, 2008, pp. 137-141, vol. 74, retrieved from the internet on Feb. 29, 2012, retrieved from the internet on Feb. 29, 2012, <URL: http://www.ars.usda.gov/research/publications/publications.htm?seq_no_115=204030>, Elsevier Ltd.

Cheng et al., "Synthesis of Cellulose Acetate from Cotton Byproducts", Carbohydrate Polymers, Apr. 1, 2010, pp. 499-452, vol. 80, No. 2, retrieved from the internet on Feb. 29, 2012, <URL: http://www.ars.usda.gov/research/publications/publications.htm?seq_no_115=246795>, Elsevier Ltd.

Li et al., "Microwave-Assisted Solvent-Free Acetylation of Cellulose with Acetic Anhydride in the Presence of Iodine as a Catalyst", Molecules, Sep. 11, 2009, pp. 3551-3566, vol. 14, Issue 9, retrieved from the Internet on Feb. 29, 2012, <URL: http://www.mendeley.com/research/microwaveassisted-solventfree-acetylation-of-cellulose-with-acetic-anhydride-in-the-presence-of-iodine-as-a-catalyst/>.

*Primary Examiner* — Sudhakar Katakam
*Assistant Examiner* — Everett White
(74) *Attorney, Agent, or Firm* — Thompson Coburn LLP; Steven M. Ritchey

(57) ABSTRACT

A reactive extrusion process for the production of substituted polysaccharides, in particular, cellulose acetate, starch acetate, carboxymethyl cellulose, and carboxymethyl starch.

15 Claims, 16 Drawing Sheets

METHOD FOR THE PRODUCTION OF SUBSTITUTED POLYSACCHARIDES VIA REACTIVE EXTRUSION

CROSS-REFERENCE TO RELATED APPLICATIONS

The present application claims the benefit of PCT/US2011/059785 filed on Nov. 8, 2011, which claimed the benefit of U.S. provisional application 61/411,521, filed on Nov. 9, 2010, U.S. provisional application 61/411,992, filed on Nov. 10, 2010, and U.S. provisional application 61/472,748, filed on Apr. 7, 2011, each of which is which is incorporated herein by reference in its entirety.

BACKGROUND OF INVENTION

The production of substituted polysaccharides such as starch and cellulose acetates and carboxymethylated starches and celluloses have typically been produced using batch reactors. During such production methods, the starch or cellulose is suspended in a mixture comprising the reactants and usually a catalyst. Undesirably, such processes require significant amounts of solvents and may require significantly more the stoichiometric amounts or reactants each of which results in waste and the higher associated costs (e.g., financial, environmental, and health) in both the production of the desired product and the treatment and disposal of waste.

For example, cellulose esters are cellulose derivatives prepared by substituting the hydroxyl groups on the glucose units in the cellulose polymer chain by an ester group. Cellulose acetate is likely produced in higher quantities than any other cellulose ester. The conventional process for producing cellulose acetate consists of a pre-treatment step in which the cellulose is treated with glacial acetic acid (seven times the weight of cellulose) for up to four hours. The pre-treated cellulose and acetic acid mixture is then reacted with chilled acetic anhydride (three times the weight of cellulose) in the'presence of a sulfuric acid catalyst. Chilled acetic anhydride is used since the reaction is highly exothermic and involves the release of a considerable amount of heat. The temperature during the initial phase of the reaction is controlled but it may be allowed to increase as the reaction proceeds. The reaction is allowed to continue until all the hydroxyl groups have reacted with acetic anhydride to give a degree of substitution (DS) of 3.

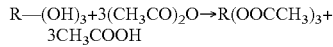

This product also is called cellulose triacetate (CTA). The complete dissolution of the cellulose indicates the completion of the reaction. The reaction is then terminated by adding water to destroy excess acetic anhydride. The CTA is then hydrolyzed in the presence of water and additional sulfuric acid. Hydrolysis is done for slight deactelyation to lower the DS and make the product acetone soluble. The product is then precipitated by adding excess water and then washed thoroughly to remove all the acetic anhydride and catalyst.

In recent times, researchers have found iodine to be a very effective catalyst for acetylation of alcohols in solvent-less conditions. Researchers then used iodine for the acetylation of cellulose and starch, which are forms of polyalcohol compounds. It was found that iodine could be successfully used as a catalyst for acetylation of cellulose in a short time. However, a solvent is still needed for batch-type processes for reacting cellulose with acetic anhydride, using iodine as a catalyst.

Starch acetate is similarly prepared by reacting starch with acetic anhydride, wherein the hydroxyl groups on the starch are replaced by acetate groups to yield starch acetate. Starch acetate has established thermo-plastic properties. It can be used in bio-degradable plastic applications like packing foams, insulations and disposable plastic goods. However, to date, the cost of manufacturing starch acetate has precluded its commercialization.

Another type of substituted polysaccharide of substantial commercial interest is polysaccharide ethers such as the sodium salt of the carboxymethyl ether of starch, also known as carboxymethyl starch (CMS), which was first prepared in 1924. Since then, carboxymethyl derivatives have been prepared from starches such as corn, amaranth, high amylose corn, potato, wheat, rice, mungbean, Chinese yam, Leucaena glauca seed gum, and wastes therefrom such as corn waste and potato flour waste.

CMS is used very widely in the textile industry as a sizing agent and as an environment friendly, textile printing and finishing agent. CMS is used as a thickening agent in foods, and for personal care and surfactant applications. Partially cross linked carboxymethyl starch, also called sodium starch glycolate, is used as a disintegrant in the pharmaceutical industry. Carboxymethyl starches have also been used in food extrusions as an additive and as an extrusion aid. Recently, researchers have tried using cross-linked carboxymethylated starch for removing heavy metal ions from water. Still further, it also finds applications in medical poultices, adhesives, absorbents, paper making and oil drilling applications.

Typically, CMS is prepared by the reaction of sodium monochloroacetate (SMCA) or chloroacetic acid with starch, in the presence of sodium hydroxide (NaOH) as a catalyst. This reaction is called the Williamson's ether synthesis. In the presence of an aqueous solution of NaOH, starch granules undergo swelling, which increases access to the starch's hydroxyl groups. For the reaction between starch and SMCA to take place, an alkaline medium is required.

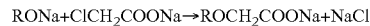

NaOH also reacts with SMCA to form sodium glycolate.

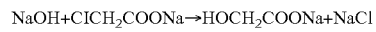

As mentioned above, a batch reactor is usually used for conducting the foregoing reaction with an aqueous alcohol used as the solvent. An aqueous solvent is used during carboxymethylation of starch, because CMS becomes soluble in water at a DS of 0.1. Sodium hydroxide is added to the starch slurry in aqueous alcohol in the batch reactor along with the reactant SMCA. Known factors for affecting the reaction include the solvent to starch ratio, the type of solvent, the concentration of solvent, the concentration of NaOH, the concentration of SMCA, the temperature, and the duration. For example, increasing temperature tends to increase the reaction rate but if the temperature is too high the starch will gelatinize, which for many applications is not the desired end product and it can cause processing problems. To avoid gelatinization batch reaction temperatures are typically controlled so as to be no greater than about 70° C., which causes the reaction kinetics to be relatively slow.

As mentioned above, batch processing of carboxymethylated starch also involves several solvent-related downsides. For example, a relatively large amount of solvent is needed and it must be heated which takes a relatively long time and is energy intensive. Also, the use of a solvent requires distillation for recycling, which requires further energy and equipment.

Another downside carboxymethylation using a batch process is that it has a relatively low reactive efficiency (RE). For example, a RE of 0.3 was reported for a CMS having a DS of 0.51 formed with a reaction time of 120 minutes, a RE of 0.1 was reported for a CMS having a DS of 0.17 formed with a reaction time of 90 minutes, a RE of 0.45 was reported for a CMS having a CMS of DS 0.49 formed with a reaction time of 100 minutes, and a RE of 0.86 was reported for a CMS having a DS 1.71 formed with a reaction time of 7 hours.

Because of these shortcomings, there has been extensive research on alternative methods of producing starch derivatives. For example, static mixers having been used to prepare hydroxypropyl ethers of starch pastes, but this resulted in gelatinization of the starch with a complete loss of its granular structure. Another method involved using a stirred vibrating fluidized bed to produce hydroxyethyl ethers of potato starch. This method formed starch ethers without losing the starch granular structure, but it was essentially a solid-gas reaction system. Another method involved blending starch with NaOH and SMCA and storing the blend in a dry state at room temperature for a period of weeks or heating it while in a blender for a period of hours, which is still generally considered to be too long to be commercially applicable.

In view of the foregoing, a need still exists for a process to produce substituted polysaccharides such as carboxymethylated and acetylated starches and celluloses having one or more of the following benefits: lower energy requirements, reduced or eliminated the need for solvent, greater reaching efficiency, higher degrees of substitution, higher degrees of polymerization, maintaining a significant degree of the crystallinity, shorter reaction times, reduced waste, reduced costs, and convenient and continuous processing.

SUMMARY OF INVENTION

One embodiment of the present invention is directed to a process for the acetylation of a polysaccharide via reactive extrusion to form a polysaccharide acetate, the process comprising:
(a) forming an extrusion mixture comprising the polysaccharide, acetic anhydride, and iodine, wherein the polysaccharide is selected from the group consisting of a starch and a cellulose, and wherein the extrusion mixture has a weight ratio of acetic anhydride to polysaccharide that in the range of about 0.5 to about 8, and wherein the iodine is at an amount such that is in the range of about 0.04 to about 5% by weight of the acetic anhydride;
(b) feeding the extrusion mixture into an extruder; and
(c) extruding the extrusion mixture to acetylate the polysaccharide and form an extrudate comprising the polysaccharide acetate.

Another embodiment of the present invention is directed to a process for producing a carboxymethylated starch via reactive extrusion, the process comprising:
(a) forming an extrusion mixture comprising a starch, sodium monochloroacetate, sodium hydroxide, ethanol, water, wherein the starch is at an amount that is in the range of about 50 to about 72% by weight of the extrusion mixture, the sodium monochloroacetate is at an amount that is in the range of about 13 to about 27% by weight of the extrusion mixture, the sodium hydroxide is at an amount in the range of about 2 to about 10% by weight of the extrusion mixture, the ethanol is at an amount that is in the range of about 2 to about 12% by weight of the extrusion mixture, the water is at an amount that is in the range of about 2 to about 12% by weight of the extrusion mixture;
(b) feeding the extrusion mixture into an extruder; and
(c) extruding the extrusion mixture to form an extrudate comprising the carboxymethylated starch.

An additional embodiment of the present invention is directed to a process for producing a carboxymethylated cellulose via reactive extrusion, the process comprising:
(a) forming an extrusion mixture comprising a cellulose, sodium monochloroacetate, sodium hydroxide, water, wherein the cellulose is at an amount that is in the range of about 5 to about 20% by weight of the extrusion mixture, the sodium monochloroacetate is at an amount that is in the range of about 12 to about 35% by weight of the extrusion mixture, the sodium hydroxide is at an amount in the range of about 8 to about 23% by weight of the extrusion mixture, the water is at an amount that is in the range of about 5 to about 60% by weight of the extrusion mixture;
(b) feeding the extrusion mixture into an extruder; and
(c) extruding the extrusion mixture to form an extrudate comprising the carboxymethylated cellulose.

DETAILED DESCRIPTION OF INVENTION

Figure 1:
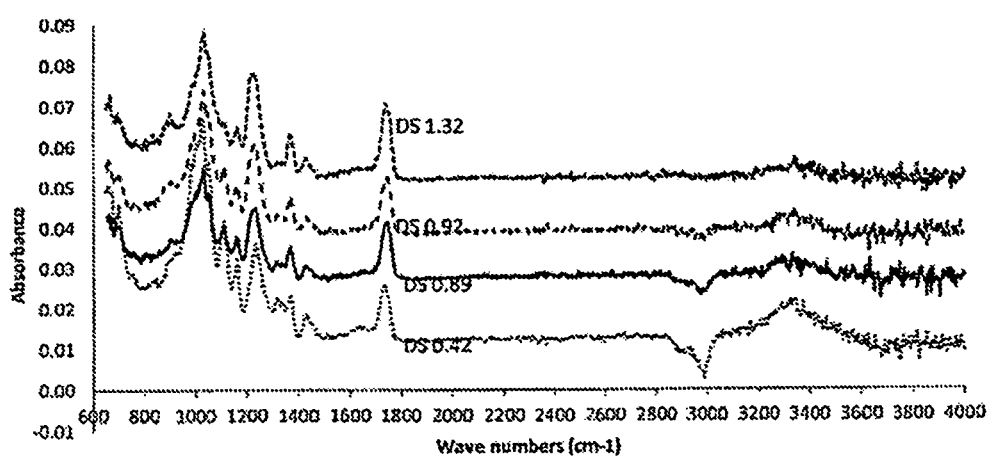
FIG. 1 is FTIR spectra for cellulose acetate with different degrees of substitutions as disclosed in Example 1, below.

The present invention is directed to a process for producing substituted polysaccharides (e.g., carboxymethylated and acetylated starches and celluloses) via reactive extrusion. By utilizing reactive extrusion, one or more of the following benefits may be realized in comparison to conventional batch reactor processing: lower energy requirements, reduced or eliminated the need for solvent, greater reaching efficiency, higher degrees of substitution, maintaining a significant degree of the crystallinity, shorter reaction times, reduced waste, reduced costs, and convenient and continuous processing. Advantageously, it has been found that using an extruder as the reactor enables greater, more uniform mixing of, and contact between the reactants and allows for higher reaction temperatures thereby significantly reducing the time needed to produce an endproduct having the desired characteristics (e.g., DS, crystallinity, DP, etc.) and/or increasing the reaction efficiency. In particular, twin-screw extruders have been found to be very effective for such processes.

In addition to the foregoing, other advantages over conventional processing have been realized. For example, conventional processes for producing cellulose acetate often use sulfuric acid as a catalyst, traces of which tend to cause degradation of the plastics made therewith over a period of time. The reactive extrusion process of the present invention may be used to produce cellulose acetate with no sulfuric acid. Instead, iodine may be used as a catalyst and it may be easily removed by a sodium thio sulfate treatment and washing. Also, because the reactive extrusion process of the present invention for producing polysaccharide acetates may be performed without pretreatment with acetic acid, there is no need to recover acetic acid after the reaction. Further, because hydrolysis of the polysaccharide may be eliminated, it is possible to obtain a desired DS in fewer process steps.

To be clear, extruders have been used for quite some time to process substituted starches. In particular, extrusion is known to be a viable processing technique for reacting starches because the relatively extreme shear, pressure, and temperature realized in an extruder easily allow for the gelatinization of the starch in the presence of moisture. During gelatinization, the starch granule breaks and the hydroxyl groups become available for reactants. In reactive extrusion, as the starch moves through the barrel, simultaneous gelatinization and reaction take place. To date, however, reactive extrusion has not been a viable method for carboxymethylated starch that is not completely gelatinized, or having a relatively high degree of substitution, or at reaction efficiencies approaching that of batch processing.

For any chemical reaction, the rate of the reaction is given by the Arrhenius equation. Consider the reaction aA+bB→cC. The rate of formation of product C is given as:

$$Rc = kCa^a Cb^b$$

where, k is the Arrhenius constant and is given as:

$$k = k_0 \cdot e^{\frac{-E}{RT}}$$

where, $k_0$ is the pre-exponential constant. In an extruder, when kneading blocks are used, they exert a shear force on the swelled starch granule. Because of this shear force there is more intimate contact between the reactants. The pre-exponential constant, which is a function of the degree of contact between the reactants, increases under such conditions resulting in a higher reaction rate. Also, because the reaction extrusion may be performed with little or no solvent, the concentration of reactants present is greater and would tend to result in higher reaction rate.

General Description of the Reactive Extrusion Process

In general, the reactive extrusion process of the present invention involves forming an extrusion mixture comprising the desired polysaccharide and the other chemical(s) for the substitution reaction. The process for comprises feeding the extrusion mixture into an extruder and extruding the extrusion mixture to cause the substitution reaction to the polysaccharide and form an extrudate comprising the substituted saccharide. Several parameters may be controlled in order to obtain a starch or cellulose acetate having certain desired characteristics (e.g, degree of substitution (DS), degree of crystallinity, and reaction efficiency (RE). Examples of such parameters include the amount of polysaccharide, the amount of chemicals for the substitution reaction, and the amount of catalyst in the extrusion mixture, the temperature of the extruder, the duration of the extruding, and the amounts of shear and pressure to which the extrusion mixture is subjected during the extruding step, which is determined for example by the number of kneading blocks, the compression screws, screw speed, and the relationship between the cross-sectional area of the chamber in which the screws and kneading blocks are located and that of the exit of the extruder.

It has been discovered that it is desirable for the exit to have a cross-sectional area that is at least 70% or 80% of the cross-sectional area of the extrusion chamber in order to ensure the cellulose fibers may pass through the extruder or to ensure that a substituted starch is not entirely gelatinized, if such is desired, due to the very high degrees of shear and pressure. More specifically, starch can be entirely melted and depolymerized which results in the loss of the granular identity of the starch. The duration of the extruding may be increased, for example, by using reverse flight screws. Alternatively, if more reaction time is desired, a static mixer could be attached to the end of the extruder. It should be noted, however, that the molecular weight of a starch that is substituted tends to decrease exponentially with an increase in the specific mechanical energy input. A more detailed disclosure is set forth below for the acetylation of polysaccharides and the carboxymethylation of polysaccharides.

It is believed that essentially any cellulose may be used in accordance with the present invention. For example, the cellulose may be a purified form such as wood pulp, cotton linter pulp or it may be in an unpurified form of lignocellulosics, or combinations thereof. In order to promote uniform and fast reactions, it is desirable for the cellulose to be fluffed and/or pulverized. Similarly, it is believed that essentially any starch may be used in accordance with the present invention. It could be from any source such as corn, potato, cassava, pea, etc. and in any form such as high amylase, waxy, etc. Further, it is believed that the starch may be pregelatinized if desired but it is believed that the process of the present invention is particular suited for treating starch that is not entirely gelatinized when making carboxymethyl starch for use as a disintegrant in pharmaceutical application (pharmaceutical applications typically require the use of a potato starch).

Acetylation of Polysaccharides

An acetylation reaction of the present invention involves using the above-described reactive extrusion process with a reaction mixture that comprises a polysaccharide such as starch or cellulose, acetic anhydride, and iodine. The use of iodine as a catalyst is perfectly suited for the reactive extrusion because the use of solvents may be reduced or eliminated. The elimination of solvents also results in higher reactant concentrations in the extruder. In a twin screw extruder very good mixing and heat transfer to the reactants can be achieved. Also, while the thermodynamic parameters of the reaction (temperature, pressure, concentration and time) affect the rate of reaction in all reactors, there is an additional parameter affecting the rate of reaction in reactive extrusion. Specifically, because of the intimate contact between the reactants as the extrusion mixture passes through the interstices between the screws and between the screw and barrel and the resulting shear forces, there is an increase in the frequency of contact between the reactant functional groups. This increases the pre-exponential constant in the Arrhenius equation and increases the reaction rate, even while the thermodynamic parameters remain constant.

In this embodiment of the present invention, several parameters may be controlled in order to obtain a starch or cellulose acetate having certain desired characteristics. Examples of such parameters include the amount of polysaccharide, the amount of acetic anhydride, and the amount of iodine in the extrusion mixture along with the above-described extruder parameters. It has been discovered that increasing the temperature of the extruder, the duration that the extrusion mixture is in the extruder, the amount of iodine, and the amount of shear and pressure generally tend to increase the DS of the resulting starch or cellulose acetate and increase the reaction efficiency. Further, it has been discovered that increasing the amount of acetic anhydride generally tends to increase the DS substituted polysaccharide and reduce the reaction efficiency. Still further, it has been discovered that increasing the amount of polysaccharide generally tends to reduce the DS of the substituted polysaccharide and increase the reaction efficiency. Additionally, it has been discovered that increasing the moisture content may retard the reaction.

In one embodiment of the present invention, the extrusion mixture has a weight ratio of acetic anhydride to polysaccharide that is in the range of about 0.5 to about 8 and iodine is at an amount such that is that is in the range of about 0.04 to about 5% by weight of the acetic anhydride. The amounts of polysaccharide and acetic anhydride are disclosed herein in terms of a weight ratio to each other and the amount of iodine is in terms of % weight of acetic anhydride. It is to be understood, that the ingredients of the extrusion mixture could be described in other ways. It has been observed that when using the foregoing amounts of polysaccharide, acetic anhydride, and iodine a polysaccharide acetate having a degree of substitution (DS) that is in the range of about 0.1 to 3 may be produced. Further, it has been observed that such acetylation reaction may have a reaction efficiency (RE) that is in the range of about 5% to about 80%. Preferably, the extruder has an exit with a cross-sectional area that is at least 80% of the cross-sectional area of the extrusion chamber.

In another embodiment a polysaccharide acetate having a DS that is no more than about 1 (a "low" DS polysaccharide) may be produced by selecting a weight ratio of acetic anhydride to polysaccharide that is in the range of about 0.5 to about 5 and preferably in the range of about 0.75 to about 3. The amount of iodine is in the range of about 0.04 to about 3% by weight of the acetic anhydride and preferably in the range of about 0.1 to about 1% by weight of the acetic anhydride. In such an embodiment, it is believed that it is desirable to control the temperature of the extruder such that it is in the range of about 100 to about 190° C. (preferably 145 to about 165° C.) and the duration of the extruding step is in the range of about 2 to about 7 minutes (preferably about 3 to about 4 minutes). Additionally, it is believed that an extruder used in this embodiment may be configured such that it has a number of kneading blocks in the range of 1 to 7 (preferably 2 to 5) and a number of compression screws in the range of 5 to 12 (preferably 6 to 9).

In another embodiment a polysaccharide acetate having a DS that is in the range of about 1 to about 2 (a "medium" DS polysaccharide) may be produced by selecting a weight ratio of acetic anhydride to polysaccharide that is in the range of about 0.8 to about 6.5 and preferably in the range of about 1 to about 4. The amount of iodine is in the range of about 0.1 to about 5% by weight of the acetic anhydride and preferably in the range of about 0.3 to about 2% by weight of the acetic anhydride. In such an embodiment, it is believed that it is desirable to control the temperature of the extruder such that it is in the range of about 100 to about 190° C. (preferably 145 to about 165° C.) and the duration of the extruding step is in the range of about 2 to about 7 minutes (preferably about 3 to about 6 minutes). Additionally, it is believed that an extruder used in this embodiment may be configured such that it has a number of kneading blocks in the range of 1 to 7 (preferably 3 to 5) and a number of compression screws in the range of 5 to 12 (preferably 7 to 12).

In another embodiment a polysaccharide acetate having a DS that is in the range of about 2 to 3 (a "high" DS polysaccharide) may be produced by selecting a weight ratio of acetic anhydride to polysaccharide that is in the range of about 1.25 to about 8 and preferably in the range of about 1.5 to about 5. The amount of iodine is in the range of about 0.2 to about 5% by weight of the acetic anhydride and preferably in the range of about 0.5 to about 3% by weight of the acetic anhydride. In such an embodiment, it is believed that it is desirable to control the temperature of the extruder such that it is in the range of about 100 to about 190° C. (preferably 155 to about 175° C.) and the duration of the extruding step is in the range of about 2 to about 7 minutes (preferably about 3 to about 6 minutes). Additionally, it is believed that an extruder used in this embodiment may be configured such that it has a number of kneading blocks in the range of 1 to 7 (preferably 3 to 6) and a number of compression screws in the range of 5 to 12 (preferably 8 to 12).

The acetylation reaction may further comprise grinding the extrudate, washing the ground extrudate with ethanol, water, or both and drying the water-washed extrudate. Additionally, the washing of the ground extrudate further comprises washing with sodium thiosulfate.

Carboxymethylation of Polysaccharides

One embodiment of the present invention is directed to a process for producing carboxymethylated polysaccharide via reactive extrusion. The process generally comprises forming an extrusion mixture comprising a polysaccharide, sodium monochloroacetate, sodium hydroxide, ethanol (which is optional in certain embodiments for processing cellulose), and water, feeding the extrusion mixture into an extruder, and extruding the extrusion mixture to form an extrudate comprising the carboxymethylated polysaccharide. It is to be noted that other basic compounds such as ammonia or potassium hydroxide or ammonium hydroxide may be used with and/or in the place of sodium hydroxide and still be within the scope of the present invention. A person of ordinary skill in the art can easily convert the amounts set forth herein for sodium hydroxide to an equivalent amount of another basic compound. Likewise, a person of ordinary skill in the art will easily recognize that monochloroacetic acid may be used with or as a replacement for sodium monochloroacetate and such a person can easily convert the amounts set forth herein with respect to sodium monochloroacetate. Additionally, the extrusion mixture may comprise a cross-linking agent such as sodium tripolyphosphate (STPP) or citric acid or epichlorohydrin, which is particularly applicable for making carboxymethyl starch (CMS) for use as a disintegrant in solid dosage forms of drugs.

In this embodiment of the present invention, several parameters may be controlled in order to obtain a carboxymethyl polysaccharide having certain desired characteristics. Examples of such parameters include the amount of polysaccharide, the amount of sodium monochloroacetate, the amount of sodium hydroxide, the amount of ethanol, the amount of water, and the amount of cross-linking agent along with the above-describe extruder parameters. It has been discovered that increasing the temperature of the extruder, the duration that the extrusion mixture is in the extruder, the amount of NaOH, and the amount of shear and pressure generally tend to increase the DS of the resulting carboxymethylated starch or cellulose and increase the reaction efficiency. Further, it has been discovered that increasing the amount of polysaccharide generally tends to increase the DS of the substituted polysaccharide and reduce the reaction efficiency. Still further, it has been discovered that increasing the ethanol to water ratio generally tends to increase the DS of the substituted polysaccharide up to a ratio of about 0.5 and further increases in ethanol may cause a reduction in the degree of substitution. Preferably, the extruder has an exit with a cross-sectional area that is at least 70% of the cross-sectional area of the extrusion chamber. A carboxymethylation process may further comprise washing an extrudate with aqueous ethanol (70-80% ethanol).

When processing cellulose, the process may further comprise maintaining the mixture under a non-oxidizing atmosphere for a duration sufficient for mercerization of the cellulose before being extruded. Alternatively, mercerization may be accomplished by extruding a mixture comprising cellulose, aqueous NaOH, and alcohol and free of SMCA. Such an extrusion mercerization process would significantly reduce the time required to attain a certain degree of mercerization. For such a process, the temperature is preferably controlled such that is in the range of about 30 to about 70° C., the duration of the extrusion is preferably in the range of about 1 to about 4 minutes, the extruder uses a number of kneading blocks in the range of 1 to 3, and is conducted under an inert atmosphere such as nitrogen.

If gelatinization of the resulting carboxymethyl starch is a concern, it has been discovered that it is preferable to either use a NaOH solution at a temperature below about 10° C. or to use solid NaOH (preferably in the form of beads that pass through a 40 mesh sieve) added just before the extrusion step.

To overcome any detrimental effects associated with some degree of gelatinization that may result from a process of the present invention, epichlorohydrin cross-linking agent may be included in the extrusion mixture. It has been observed that including epichlorohydrin may allow for the production of relatively high crystalline carboxymethyl cellulose having a relatively high degree of liquid uptake.

A more detailed disclosure is set forth below for the carboxymethylation of starch and cellulose.

Carboxymethyl Starch

In one embodiment the reaction mixture comprises starch, sodium monochloroacetate, sodium hydroxide, ethanol, and water. The starch is at an amount that is in the range of about 50 to about 72% by weight of the extrusion mixture and preferably is in the range of about 55 to about 67% by weight of the extrusion mixture. The sodium monochloroacetate is at an amount that is in the range of about 13 to about 27% by weight of the extrusion mixture and preferably the range of about 16 to about 24% by weight of the extrusion mixture. The sodium hydroxide is at an amount in the range of about 2 to about 10% by weight of the extrusion mixture and preferably in the range of about 4 to about 8% by weight of the extrusion mixture. The ethanol is at an amount that is in the range of about 2 to about 12% by weight of the extrusion mixture and preferably in the range of about 4 to about 10% by weight of the extrusion mixture. The water is at an amount that is in the range of about 2 to about 12% by weight of the extrusion mixture and preferably in the range of about 4 to about 10% by weight of the extrusion. The reaction mixture may optionally comprise epichlorohydrin as a cross-linking agent. If present, the epichlorohydrin is typically at an amount that does not exceed about 2% by weight of the extrusion mixture.

It has been observed that when using the foregoing amounts of the constituents a carboxymethyl starch having a degree of substitution (DS) that is in the range of about 0.22 to 0.35 may be produced. Further, it has been observed that such reaction may have a reaction efficiency (RE) that is in the range of about 25% to about 85%.

In such an embodiment, it is believed that it is desirable to control the temperature of the extruder such that it is in the range of about 70 to about 100° C. and the duration of the extruding step is in the range of about 1 to about 4 minutes. Additionally, it is believed that an extruder used in this embodiment may be configured such that it has a number of compression screws in the range of 5 to 12 and, optionally, a number of kneading blocks not to exceed 3.

Carboxymethylation of Cellulose

In one embodiment the reaction mixture comprises cellulose, sodium monochloroacetate, sodium hydroxide, and water. The cellulose is at an amount that is in the range of about 5 to about 20% by weight of the extrusion. The sodium monochloroacetate is at an amount that is in the range of about 12 to about 35% by weight of the extrusion mixture. The sodium hydroxide is at an amount in the range of about 8 to about 23% by weight of the extrusion mixture. The water is at an amount that is in the range of about 5 to about 60% by weight of the extrusion mixture. The reaction mixture may optionally comprise ethanol. If present, the amount of ethanol is typically at an amount that is no greater than about 5% by weight of the extrusion mixture. The reaction mixture may optionally comprise epichlorohydrin as a cross-linking agent. If present, the epichlorohydrin is typically at an amount that does not exceed about 5% by weight of the extrusion mixture. The reaction may optionally comprise both ethanol and epichlorohydrin in accordance with the foregoing amounts.

In another embodiment a carboxymethyl cellulose having a relatively high degree of crystallinity (e.g., in the range of about 0.4 to about 0.6) may be produced by selecting the cellulose to be at an amount that is in the range of about 7 to about 17% by weight of the extrusion mixture. The sodium monochloroacetate is at an amount that is in the range of about 16 to about 30% by weight of the extrusion mixture. The sodium hydroxide is at an amount in the range of about 10 to about 21% by weight of the extrusion mixture. The water is at an amount that is in the range of about 42 to about 55% by weight of the extrusion mixture. The reaction mixture may optionally comprise ethanol. If present, the amount of ethanol is typically at an amount that is no greater than about 5% by weight of the extrusion mixture. The reaction mixture may optionally comprise epichlorohydrin as a cross-linking agent. If present, the epichlorohydrin is typically at an amount that does not exceed about 5% by weight of the extrusion mixture. The reaction may optionally comprise both ethanol and epichlorohydrin in accordance with the foregoing amounts. When preparing a high crystallinity carboxymethyl cellulose, it may be desirable for the process to further comprise neutralizing excess NaOH with citric acid. It has been observed that when using the foregoing amounts of the constituents a carboxymethyl cellulose having a degree of substitution (DS) that is in the range of about 0.25 to 1.2 may be produced. Further, it has been observed that such a reaction may have a reaction efficiency (RE) that is in the range of about 15% to about 80%. In such an embodiment, it is believed that it is desirable to control the temperature of the extruder such that it is in the range of about 120 to about 170° C. and the duration of the extruding step is in the range of about 1 to about 4 minutes. Additionally, it is believed that an extruder used in this embodiment may be configured such that it has no kneading blocks or a number of kneading blocks not exceeding 8 and a number of compression screws in the range of 5 to 12.

In yet another embodiment, a carboxymethyl cellulose having a relatively high degree of crystallinity (e.g., in the range of about 0.4 to about 0.6) may be produced by selecting the cellulose at an amount that is in the range of about 10 to about 14% by weight of the extrusion mixture. The sodium monochloroacetate is at an amount that is in the range of about 21 to about 26% by weight of the extrusion mixture. The sodium hydroxide is at an amount in the range of about 14 to about 17% by weight of the extrusion mixture. The water is at an amount that is in the range of about 47 to about 51% by weight of the extrusion mixture. The reaction mixture contains no ethanol. The reaction mixture may optionally comprise epichlorohydrin as a cross-linking agent. If present, the epichlorohydrin is typically at an amount that does not exceed about 5% by weight of the extrusion mixture. When preparing a high crystallinity carboxymethyl cellulose, it may be desirable for the process to further comprise neutralizing excess NaOH with citric acid. It has been observed that when using the foregoing amounts of the constituents a carboxymethyl cellulose having a degree of substitution (DS) that is in the range of about 0.45 to 0.9 may be produced. Further, it has been observed that such a reaction may have a reaction efficiency (RE) that is in the range of about 15% to about 80%. In such an embodiment, it is believed that it is desirable to control the temperature of the extruder such that it is in the range of about 140 to about 160° C. and the duration of the extruding step is in the range of about 1 to about 4 minutes. Additionally, it is believed that an extruder used in this embodiment may be configured such that it has a number of kneading blocks in the range of 3 to 7, and a number of compression screws in the range of 7 to 12.

In another embodiment a carboxymethyl cellulose having a relatively low degree of crystallinity (e.g., in the range of about 0.18 to about 0.43) may be produced by selecting the cellulose at an amount that is in the range of about 7 to about 16% by weight of the extrusion mixture. The sodium monochloroacetate is at an amount that is in the range of about 17 to about 31% by weight of the extrusion mixture. The sodium hydroxide is at an amount in the range of about 10 to about 21% by weight of the extrusion mixture. The water is at an amount that is in the range of about 5 to about 55% by weight of the extrusion mixture. The reaction mixture also comprises ethanol at an amount that is in the range of about 7 to about 55% of the extrusion mixture. When preparing a low crystallinity carboxymethyl cellulose, it may be desirable for the process to further comprise neutralizing excess NaOH with acetic acid. It has been observed that when using the foregoing amounts of the constituents a carboxymethyl cellulose having a degree of substitution (DS) that is in the range of about 0.15 to 1.2 may be produced. Further, it has been observed that such a reaction may have a reaction efficiency (RE) that is in the range of about 15% to about 80%. In such an embodiment, it is believed that it is desirable to control the temperature of the extruder such that it is in the range of about 120 to about 170° C. and the duration of the extruding step is in the range of about 1 to about 4 minutes. Additionally, it is believed that an extruder used in this embodiment may be configured such that it has a no kneading blocks or a number of kneading blocks not exceeding 8 and a number of compression screws in the range of 5 to 12.

In yet another embodiment a carboxymethyl cellulose having a relatively low degree of crystallinity (e.g., in the range of about 0.18 to about 0.43) may be produced by selecting the cellulose at an amount that is in the range of about 10 to about 13% by weight of the extrusion mixture. The sodium monochloroacetate is at an amount that is in the range of about 19 to about 27% by weight of the extrusion mixture. The sodium hydroxide is at an amount in the range of about 14 to about 17% by weight of the extrusion mixture. The water is at an amount that is in the range of about 10 to about 40% by weight of the extrusion mixture. The reaction mixture also comprises ethanol at an amount that is in the range of about 12 to about 50% of the extrusion mixture. When preparing a low crystallinity carboxymethyl cellulose, it may be desirable for the process to further comprise neutralizing excess NaOH with acetic acid. It has been observed that when using the foregoing amounts of the constituents a carboxymethyl cellulose having a degree of substitution (DS) that is in the range of about 0.3 to 0.9 may be produced. Further, it has been observed that such a reaction may have a reaction efficiency (RE) that is in the range of about 15% to about 80%. In such an embodiment, it is believed that it is desirable to control the temperature of the extruder such that it is in the range of about 140 to about 160° C. and the duration of the extruding step is in the range of about 1 to about 4 minutes. Additionally, it is believed that an extruder used in this embodiment may be configured such that it has a number of kneading blocks in the range of about 3 to 7 and a number of compression screws in the range of 7 to 12.

Carboxymethylation of high molecular weight cellulose with various degrees of substitution and crystallinity may be obtained. For example, as set forth in detail in the Examples below, carboxymethyl cellulose having a high degree of crystallinity (e.g., 0.48-0.51), including a high cellulose-II crystalline fraction (e.g., 0.36-0.30), and having a degree of substitution of, for example, 0.43-0.46 may be produced. Such carboxymethyl cellulose exhibits a very fast rate of saline uptake that is comparable to that for sodium polyacrylate, a commercially used super absorbent. The saline uptake of such carboxymethyl cellulose is much higher in extent and rate than that of commercially available carboxymethyl cellulose (AQUASORB A500, Ashland Aqualon Functional Ingredients). This, such carboxymethyl cellulose of the present invention is believed to be suitable for super absorbent applications. Other carboxymethyl cellulose produced had a crystallinity 0.36, cellulose-II crystalline fractions of 0.15 and 0.18, and a degree of substitution of 0.6, which is similar to that of commercially available carboxymethyl cellulose (AQUASORB A500). Moreover, by varying the amounts of NaOH, sodium mono chloro acetate, ethanol and water, degree of substitutions from 0.1 to 1.1, degree of crystallinity from 0.18 to 0.51, and cellulose-II crystalline fraction of 0.15-0.36 were obtained.

EXAMPLES

Example 1

Cellulose Acetate

Equipment.

A co-rotating twin-screw extruder (model TSE-20, Brabender Technologies Inc., South Hackensack, N.J.) was used. The extruder comprises for heating zones but the first zone was not used because there was only sufficient screw elements for three zones. Therefore, reaction formulations were hand fed into the second zone. It is believed, however, that, if possible, feeding into the first zone would have been a better option. Additionally, the extruder was operated without a die in order to limit the heat, shear, and pressure to prevent complete gelatinization of starch and because of fibrous nature of the cellulose. If extrudates were ground, a model F203, Krups, USA grinder was used. A model 31BL92, Waring Products Limited, New Hartford, Conn. blender was used to shred cellulose sheet pieces. Scanning electron microscope was a Model S-3000N available from Hitachi High Technologies America Inc., San Jose, Calif. X-ray diffractograms were obtained using Rigaku D/Max-B diffractometer form Rigaku Americas, The Woodlands, Tex. H-NMR spectra were acquired using a Bruker Avance 400 (Billerica, Mass.) spectrometer operated at a 400 MHz magnetic field. DMSO-$d_6$ was used as a solvent for cellulose acetate. Spectra were obtained at 100° C. using 512 scans for each sample.

Chemicals.

Acetic anhydride was (99.7% pure from Fisher Scientific, Pittsburgh, Pa. Iodine was 99.5% pure, resublimed, from Acros Organics, New Jersey. Ethanol was from Decon Labs, King of Prussia, Pa.

Experiment.

The objective of Example 1 was to explore the acetylation of cellulose using reactive extrusion. The effects of the reaction stoichiometry on the physicochemical properties of the cellulose acetate prepared using reactive extrusion were studied by using the acetic anhydride (AA):cellulose ratio and the iodine concentration as the experimental variables. The experimental design was 3×5 factorial design with five different iodine concentrations and three different AA:cellulose ratios and was replicated twice.

Cotton linter pulp sheets (Grade 1ARY, $DP_w$=2934, Buckeye Technologies Inc., Memphis, Tenn.) were cut into 15×15 mm pieces using a sheet cutter and then shredded into a fluff using a blender. Acetic anhydride with iodine dissolved in it, was then added to the cellulose and shredded in a blender. The temperature profile for the extruder was set at 160-160-160° C. The extruder screw configuration is set forth in Table 1, below.

TABLE 1

| No. of screw elements (from die end) | Element Type | Element length (mm) |
| --- | --- | --- |
| 9 | Compression | 20 |
| 4 | Conveying | 30 |
| 1 | Kneading | 30 |
| 1 | Conveying | 30 |
| 1 | Kneading | 20 |
| 8 | Conveying | 30 |

The extrudates were collected, ground, and then washed with ethanol (1:20 w/v ratio) for five hours. The ethanol washing was repeated five times. The extrudate was then washed with distilled water and dried in a vacuum oven.

The degree of substitution of cellulose acetate was determined by using the procedure described by Green J. W. and BeMiller J. N., Methods in Carbohydrate Chemistry, 1963, Vol. III, p. 407 with slight modifications. Cellulose acetate was dried overnight, in a vacuum oven, at 50° C. in order to remove any moisture present. In a 250 ml Erlenmeyer flask, 0.5 g cellulose acetate was accurately added and then suspended in 20 mL of 75% aqueous ethanol solution. The flasks were then heated in a shaking water bath at 50-60° C. for 30 minutes. Then, 20 mL of 0.5N NaOH solution was accurately added to the flask and then again heated in a shaking water bath at 50-60° C. for 15 minutes. The flask was then stoppered and allowed to stand at room temperature for 48 hours, after which the excess alkali was back titrated using 0.5N sulfuric acid. Reagent blanks were also prepared and a similar procedure was followed for them. Each measurement was replicated once.

The % acetyl content was then calculated according to the following equation:

$$\% \text{ Acetyl} = [(A-B)N_b - (C-D)N_a] \times 4.3/W;$$

wherein;
A=amount of NaOH solution added to the sample (mL);
B=amount of NaOH solution added to the blank (mL)
$N_b$=normality of NaOH solution;
C=amount of sulfuric acid solution added to the sample (mL);
D=amount of sulfuric acid solution added to the blank (mL);
$N_a$=normality of sulfuric acid solution; and
W=weight of sample (g).

The degree of substitution is then determined according to following equation:

$$DS = (3.86 \times \% \text{ acetyl})/(102.4 - \% \text{ acetyl}).$$

Using the foregoing equations, the effects of the AA:cellulose ratios and iodine concentrations on the average the degree of substitution (DS) or the produced cellulose acetate along with the reaction efficiency (RE) are set forth in Table 2, below.

TABLE 2

| AA:cellulose (v/w) | Iodine (w/v %) | DS | RE (%) |
|---|---|---|---|
| 4.5 | 0.25 | 0.29 | 3.8 |
| 5.25 | 0.25 | 0.46 | 5.1 |
| 6 | 0.25 | 0.59 | 5.8 |
| 4.5 | 0.5 | 0.55 | 7.2 |
| 5.25 | 0.5 | 0.70 | 7.8 |
| 6 | 0.5 | 0.82 | 7.9 |
| 4.5 | 1 | 0.98 | 12.7 |
| 5.25 | 1 | 1.05 | 11.7 |
| 6 | 1 | 1.05 | 10.2 |
| 4.5 | 2 | 1.10 | 14.3 |
| 5.25 | 2 | 1.28 | 14.2 |
| 6 | 2 | 1.21 | 11.8 |
| 4.5 | 3 | 1.34 | 17.3 |
| 5.25 | 3 | 1.41 | 15.7 |
| 6 | 3 | 1.39 | 13.5 |

As is set forth in Table 2, the maximum DS (1.41) was at a reaction efficiency of 15.7% for an AA:cellulose ratio of 5.25 v/w and a 3% iodine concentration. The maximum reaction efficiency of 17.3% was obtained with a AA:cellulose ratio of 4 v/w and a 3% iodine concentration. Statistical analysis revealed that the effects of the AA:cellulose ratio (P<0.0001) and iodine concentration (P<0.0001), on the DS, were significant and also that there was no significant interaction between the AA:cellulose ratio and iodine concentration (P=0.2945). The DS obtained for A:cellulose ratios of 5.25 and 6 v/w were significantly higher than for the AA:cellulose ratio of 4 v/w (P=0.0005 and P<0.0001, respectively). However, no statistical difference could be found between the DS obtained for AA:cellulose ratios of 5.25 and 6 v/w. The fact that increasing the AA:cellulose ratio from 5.25 to 6 did not result in an increase in DS, indicates that, at high a AA:cellulose ratio, the reaction rate may have been independent of the acetic anhydride concentration and time was a limiting factor in the reactive extrusion process. The DS also increased with an increase in the iodine concentration from 0.25% to 0.5% (P<0.0001), 0.5% to 1% (P<0.0001), 1% to 2% (P=0.0003), and 2% to 3% (P<0.0001).

Fourier-transform infrared spectroscopy (FTIR) was also performed on the produced cellulose acetate, in the 650 $cm^{-1}$ to 4000 $cm^{-1}$ region using a Thermo Nicolet Avatar 360 FT-IR E.S.P. spectrometer. Sixteen scans were obtained per image with a resolution of 4 $cm^{-1}$. The FTIR spectra of cellulose acetate in the wave numbers of 650-4000 $cm^{-1}$ are summarized in FIG. 1. The region 3000-3600 $cm^{-1}$ corresponds to stretching of hydroxyl groups, 1650-1800 $cm^{-1}$ corresponds to C=O and 1200-1350 $cm^{-1}$ corresponds to the methyl from the acetyl group. The peaks observed at 1250 $cm^{-1}$ and 1750 $cm^{-1}$ confirm the acetylation of cellulose.

Scanning electron microscopy (SEM) was also performed to view the microstructures of the produced cellulose acetate. The microstructure of cellulose acetate prepared using AA:cellulose ratio of 4.5 (v/w) and an iodine concentration of 0.25 wt %, when viewed at 100× magnification, showed the presence of fibers 17-23 μm in thickness. Additionally, fines were observed but they are attributed as mostly likely the result of the grinding. When viewed at 1000× magnification, some damaged surfaces of the fibers, especially at the fiber ends, were observed but the other portions of the fiber surfaces were relatively smooth. Turning to the microstructure of the cellulose acetate prepared used an AA:cellulose ratio of 6 (w/v) and 1% iodine concentration, at 100× magnification fibers of 12-30 μm in thickness. At 1000× magnification, cellulose acetate had some damaged surfaces, especially the fiber ends, but also relatively smooth surfaces in other places. The cellulose acetate prepared using an AA:cellulose ratio of 5.25 (v/w) and a 3% iodine concentration had fibers of 11-29 μm in thickness with relatively smooth surfaces, but some agglomeration and coiling of some of fibers to form a granular-like material was observed.

Figure 2:
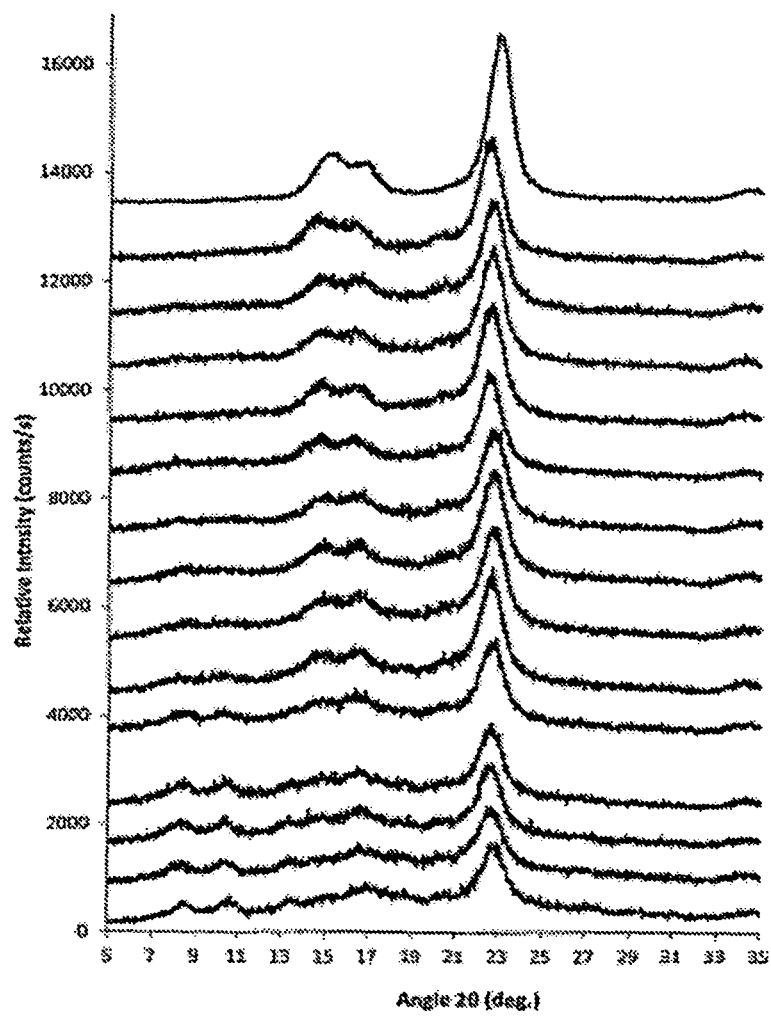
FIG. 2 is X-ray diffraction patterns for cellulose acetate with different degrees of substitutions as disclosed in Example 1, below.

X-ray diffraction was used to study the crystalline structures of cellulose acetate and cotton linter pulp. X-ray diffractograms, illustrating the effects of AA:cellulose ratios and iodine concentrations and the corresponding DS, on the crystalline structures of cellulose acetate are set forth in FIG. 2. The diffractogram of wood pulp (the profile with the greatest intensity) exhibits peaks at 2θ angles of 14.7°, 16.1°, 22.4° and 34.2° is characteristic of cellulose I crystalline structure. In the diffractograms of cellulose acetates prepared at all conditions, the peak at 22.4° is retained and prominently displayed, indicating the preservation of cellulose I crystalline structure. The intensity of this peak, however, decreases with an increase in DS thereby indicating that the amorphous regions of cellulose were preferentially acetylated. That said, as the DS increased, there may have been some acetylation in the crystalline regions also causing a reduction in crystallinity. The diffractogram of cellulose acetate prepared with an AA:cellulose ratio of 4.5 and 1% iodine concentration shows the first sign of peaks in the 2θ range of 5-10°. These peaks become prominent at 2θ angles of about 8.5° and 10.5° for cellulose acetate prepared with 2% and 3% iodine concentrations, which also have a peak at about 13.5° and a broad peak at about 17°.

Cellulose triacetate exists in two polymorphic crystalline forms CTA I and CTA II. However, these crystalline forms have been observed to exist, even at lower degrees of substitution (e.g., 0.4). The diffractograms of cellulose acetate prepared in this study resembles that of CTA II crystalline form which has characteristic peaks at 8.4°, 10.4°, 13.4°, 16.3°, 16.7°, 18.6° and 23.4°. According to some researchers, the CTA II crystalline form is obtained by homogeneous acetylation or by a high degree of swelling of cellulose I. Also, there is some evidence that CTA II could be obtained at high acetylating temperatures. It has been reported that acetylation catalyzed by iodine is homogeneous when the iodine ($I_2$) used approaches 5 mole % of AGU. In this study, the molar amounts of $I_2$ exceeded 5% of that of AGU when 2% and 3% iodine concentrations in AA (w/v) were used. It is believed that this explains the prominence of the peaks at 2θ angles of 8.4°, 10.4°, 13.4°, and the broad peak at 17° in the diffractogram, which correspond to CTA II crystalline form, when iodine concentrations of 2% and 3% were used.

Figure 3:
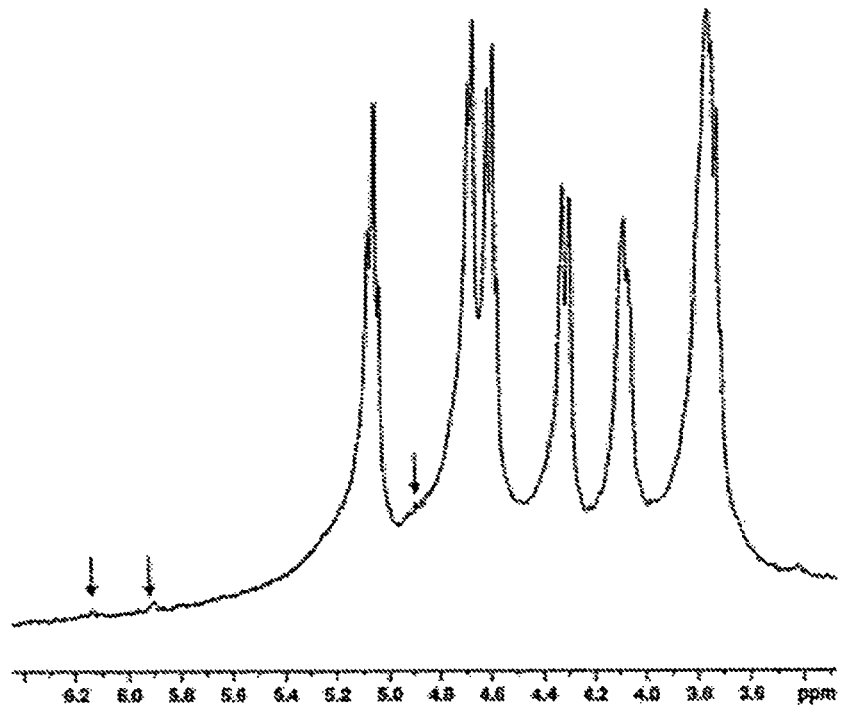
FIG. 3 is $^1$H-NMR spectra for cellulose acetate prepared using an AA:cellulose ration of 6 and 3% iodine concentration having a DS of 1.49 as disclosed in Example 1, below.
Figure 4:
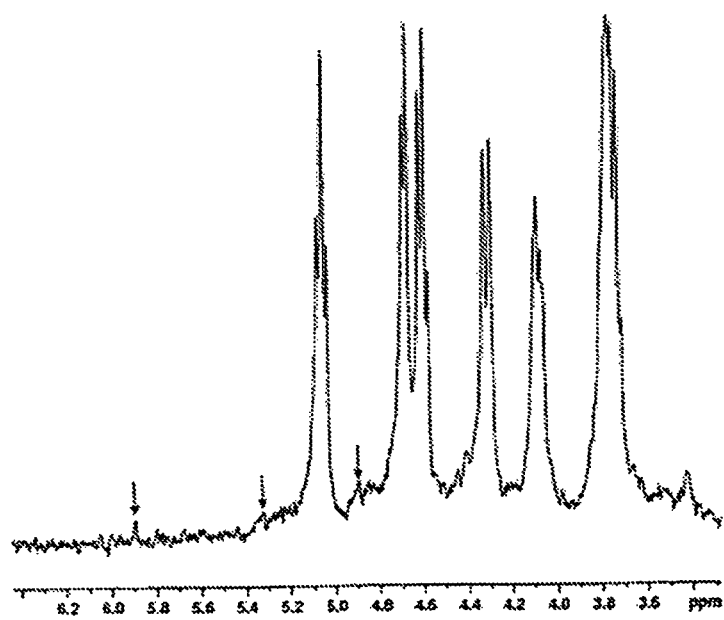
FIG. 4 is $^1$H-NMR spectra for cellulose acetate prepared using an AA:cellulose ration of 5.25 and 1% iodine concentration having a DS of 1.14 as disclosed in Example 1, below.
Figure 5:
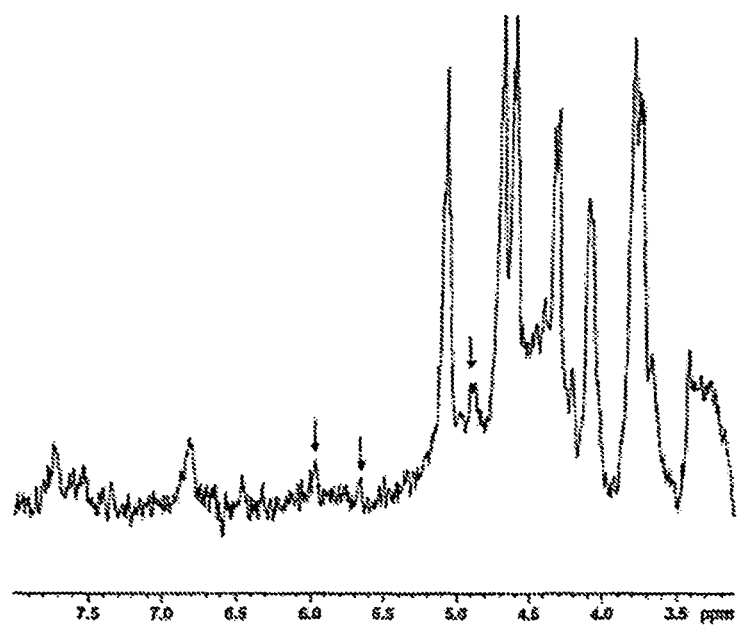
FIG. 5 is $^1$H-NMR spectra for cellulose acetate prepared using an AA:cellulose ration of 6 and 0.25% iodine concentration having a DS of 0.61 as disclosed in Example 1, below.

The $^1$H-NMR spectra for cellulose acetate prepared using an AA:cellulose ratio of 6 and 3% iodine concentration (DS=1.49), an AA:cellulose ratio of 5.25 and 1% iodine concentration (DS=1.14), and an AA:cellulose ratio of 6 and 0.25% iodine concentration (DS=0.61) are shown in FIGS. 3, 4, and 5, respectively. The spectra of cellulose acetate prepared with AA:cellulose ratio of 6 and 3% iodine concentration had the least amount of noise although all the spectra had broad peaks. This may have been because of the poor solubility of cellulose acetate prepared using reactive extrusion in DMSO. Cellulose acetate prepared using AA:cellulose ratio of 6 and 3% iodine concentration may have had slightly better solubility. The multiple peaks in the $^1$H-NMR spectra, observed in the range of 3.4-5.3 ppm are due to protons on the AGU. The $^1$H-NMR spectra also show the presence of carbohydrate oligomers which implies the reduction of cellulose molecular weight during the reaction. The peaks showing the presence of carbohydrate oligomers have been indicated in the spectra and are observed around 4, 4.2, 4.75, 4.8-4.9, 5.25, 5.8 and 6.1 ppm. It is interesting to note that cellulose oligomers were observed even when a low iodine concentration (0.25%) was used.

Example 2

Cellulose Acetate 226 g of acetic anhydride with 2.6 g iodine (1.15% by weight of acetic anhydride) dissolved in it was added uniformly to 60 g cellulose. This reaction formulation was then hand fed to a Brabender TSE-20 extruder. Three kneading blocks and a barrel temperature profile of 100-140-120° C. were used. The extrudate from the extruder was collected and stored in a plastic bag until it cooled. The extrudate was then washed with a saturated solution of sodium thiosulfate. Sodium thiosulfate converted iodine to iodide which turned the solution from brown to colorless. The extrudate was then washed with ethanol and water. The extrudate was ground and washed again with ethanol and water. The purified product was dried in a vacuum oven. The DS of the product was measured as described by (Tanghe et al., 1963). The cellulose was successfully esterified in the extruder to a DS of 1.75.

Example 3

Cellulose Acetate 226 g of acetic anhydride, with 1.1 g iodine (0.48% by weight of acetic anhydride) dissolved in it was added uniformly to 60 g cellulose. The reaction conditions and procedures were as set forth for Example 2, above. Cellulose acetate with a DS of 0.73 was obtained.

Example 4

Starch Acetate

Process for preparation of starch acetate was similar to that of cellulose acetate. Regular corn starch was mixed with acetic anhydride which had iodine dissolved in it. The reaction mixture was then fed to the extruder. The reaction mixture was in the form of slurry. The extruder temperature profile was 120-120-150° C. and the screw speed was 40 rpm. The results are summarized in Table 3, below.

TABLE 3

| Starch:AA ratio | Iodine (wt % of AA) | DS |
|---|---|---|
| 1 | 1 | 0.41 |
| 0.75 | 7 | 0.36 |
| 1 | 0.5 | 0.07 |
| 0.75 | 0.5 | 0.03 |

It is believed that higher degrees of substitution may be obtained by increasing iodine concentration, the starch:acetic anhydride ratio, and reaction time (see Example 5).

Example 5

Starch Acetate

Pregelatinized corn starch (Colorcon Inc. Massy, France) was fed to the extruder and acetic anhydride with iodine dissolved in it was injected into the extruder barrel. The weight ratio of starch to acetic anhydride was 1:0.75. Iodine concentrations of 2 wt % and 5 wt % of acetic anhydride were used. At both these iodine concentrations, starch acetates with degrees of substitution (DS) of 0.85 were obtained. The temperature used was 170° C. and screw speed was 30 rpm.

Example 6

Carboxymethyl Starch

Preparation of Samples for Extrusion.

A mixture of 500 g of corn starch, having 7% moisture dry basis, and 130 g of dry sodium monochloroacetate (SMCA) was uniformly sprayed with a NaOH solution in water with constant mixing Hobart C-100 planetary type mixer. The NaOH solution was sprayed uniformly because of the instant swelling it causes to starch. As indicated below, in certain formulations of this example, specified amounts of citric acid, sodium tripolyphosphate (STPP), epichlorohydrin, and ethanol also were added. The formulations were subjected to continued mixing for 10 minutes. In some cases, potato starch (11.75% moisture, dry basis) was used. Also, in some cases, the method of adding NaOH to the formulations was modified as indicated.

Extrusion Parameters.

A Brabender TSE-20 (C.W. Brabender Instruments Inc., South Hackensack, N.J.) co-rotating twin-screw extruder was used for the reactive extrusions. The starch-reactant formulation was fed using a Brabender PW40PLUS-0 (Brabender Technologies Inc., Ontario, Canada) flex-wall volumetric feeder. The screw configurations are detailed in Table 4. The extruder was operated without a die or nozzle. The extruder barrel temperature was set according to the experimental design. The extrudates were collected in trays and allowed to cool to 25° C. for 30 minutes.

TABLE 4

| Screw profile no. | No. of kneading blocks | Configuration[a] (from die end) |
|---|---|---|
| 1 | 0 | 9 (20R) + 8 (30R) |
| 2 | 3 | 9 (20R) + 3 (KC) + 6 (30R) |
| 3 | 2 | 9 (20R) + 1 (30R) + 2 KC + 6 (30R) |
| 4 | 1 | 9 (20R) + 3 (30R) + 1 (KC) + 5 (30R) |

[a]30R represents a 30 mm convey segment, 20R represents a 20 mm convey segment with short pitch, KC represents a 20 mm kneading convey segment CMS Extrudate Purification.

CMS extrudates were ground using a Krups GX4100 (Millville, N.J.) grinder. Ground extrudates were purified to remove unreacted SMCA and the NaCl and sodium glycolate byproducts. Two grams of ground extrudate was washed with 40 mL of 80% aqueous ethanol for 30 minutes. During washing of the sample, the pH was neutralized using citric acid. After the sample had been washed, the ethanol was decanted. This procedure was repeated twice. The purified CMS extrudates were washed with 95% aqueous ethanol and then dried overnight in a vacuum oven at 50° C. There was no observed loss of carboxymethyl starch during purification.

NaCl Measurement.

The NaCl content in the purified carboxymethyl starch was measured using the method described by the British Pharmacopoeia. In 100 mL of distilled water, 0.5 g of purified carboxymethyl starch was suspended along with 1 mL of nitric acid. This suspension was then titrated potentiometrically with 0.1 M silver nitrate using a silver indicator electrode. One milliliter of 0.1 M silver nitrate is equivalent to 5.844 mg of NaCl. The NaCl content was calculated according to the following equation:

$$\text{NaCl } (\%) = \frac{V_1 * \frac{5.844}{1000}}{W_1} \times 100$$

wherein, $V_1$ (mL) is the amount of 0.1 M silver nitrate added until the point of inflection was reached and $W_1$ (g) is the weight of CMS.

Assay Measurement.

The CMS was assayed according to the method presented by British Pharmacopoeia. The assay gave the weight percentage of Na present in CMS, in the form of sodium carboxymethyl ether. Purified CMS (0.7 g) was refluxed in 70 mL of glacial acetic acid for 2 hours and then allowed to cool to room temperature. Then, the refluxed sample was titrated potentiometrically using a 0.1 M solution of perchloric acid in glacial acetic acid. A Fisher Scientific Accument BASIC AB 15+(Hampton, N.H.) pH meter with a glass, single-junction electrode with silver/silver chloride, reference was used to measure the potential difference during titration. One milliliter of 0.1 M perchloric acid is equivalent to 2.299 mg of Na. Measurements were replicated once, and the average value was recorded. The assay was calculated according to the following equation:

$$\% \text{ Na} = \frac{V_1 * \frac{2.299}{1000}}{W_1} * 100$$

wherein $V_1$ (ml) is the amount of 0.1 M perchloric acid added until the point of inflection was reached and $W_1$ (g) is weight of CMS used for determining the assay. Then the assay was converted to DS according to the following equation:

$$DS = \frac{\left[\frac{\text{Assay}}{2300} * 162\right]}{\left[1 - \left(\frac{\text{Assay}}{2300} * 80\right)\right]}$$

Swelling Ability in Water.

In a beaker with 30 mL of distilled water at 25° C., 1 g of purified CMS was added. The behavior of the CMS when added to water was observed.

Fourier-Transform Infrared Spectroscopy.

The Fourier-transform Infrared (FTIR) spectra of native potato starch and carboxymethyl starch were obtained using a Smiths Detection SensIR (Danbury, Conn.) FTIR microscope, with an attenuated-total-reflectance (ATR) objective. Powdered carboxymethyl starch was pressed against the objective and analyzed directly. Thirty-two scans were acquired per image at a resolution of 4 cm$^{-1}$.

Microstructure of Carboxymethyl Starch.

The microstructure of carboxymethyl starch was examined using a Hitachi S-3000N (San Jose, Calif.) variable pressure scanning electron microscope. A small amount of powdered carboxymethyl starch was placed on a metal stub with a double sided adhesive tape. This carboxymethyl starch was sputter coated with gold under vacuum to render them conductive. Microstructure image was then acquired at a 200× magnification and at a 1280×960 pixel resolution.

Statistical Analyses.

Several factorial designs, described below were used to determine the effects of the' reaction variables on the degree of substitution. Experiments in the factorial designs were replicated once. The response variable (degree of substitution) was analyzed using the "Proc Mixed" procedure of SAS, version 9.1 (SAS Institute Inc., Cary, N.C.), with a significance level of α≤0.05. The statistical significance is reported using P values, which is the probability of error in accepting the result as true.

The effects of NaOH, water (H$_2$O), and extruder barrel temperature on the DS were studied using a 3×2×2 factorial design with corn starch at 500 g, SMCA at 130 g, and screw configuration 1, with three levels of NaOH (10, 15, and 20 g), two levels of H$_2$O (40 and 50 g), and two extruder-barrel temperature profiles (80-85-85 and 95-90-85° C.). The results are summarized in Table 5.

TABLE 5

| NaOH (g) | H$_2$O (g) | Temperature (° C.) | DS |
|---|---|---|---|
| 10 | 40 | 80-85-85 | 0.09 |
| 15 | 40 | 80-85-85 | 0.1 |
| 20 | 40 | 80-85-85 | 0.12 |
| 10 | 50 | 80-85-85 | 0.11 |
| 15 | 50 | 80-85-85 | 0.12 |
| 20 | 50 | 80-85-85 | 0.13 |

TABLE 5-continued

| NaOH (g) | H$_2$O (g) | Temperature (° C.) | DS |
|---|---|---|---|
| 10 | 40 | 95-90-85 | 0.07 |
| 15 | 40 | 95-90-85 | 0.12 |
| 20 | 40 | 95-90-85 | 0.14 |
| 10 | 50 | 95-90-85 | 0.08 |
| 15 | 50 | 95-90-85 | 0.12 |
| 20 | 50 | 95-90-85 | 0.14 |

The effect of the amount of NaOH on the DS was found to be significant (P<0.0005). Examination of the simple main effects revealed that the DS with 15 g of NaOH was significantly higher than that with 10 g of NaOH (P<0.05), and also the DS with 20 g of NaOH was found to be significantly higher than that with 10 g of NaOH (P<0.0005). However, no statistical difference was detected between the DS values with 15 and 20 g of NaOH. However, it seems that NaOH might have limited the DS, because the DS values obtained were similar to the molar ratios of NaOH and starch. The DS of CMS was measured only after ensuring that the NaCl content was below 0.1 wt %, as large residual NaCl amounts affect the DS measurements.

It has been reported for batch processes that the DS increased with an increase in the concentration of NaOH until it reached a peak and then decreased. But, this was only when the reaction was allowed to go to completion. It has also been reported for NaOH concentrations above the peak concentration that, although the final DS was lower, the initial rate of reaction is greater. In view of these reports, it is believed that for shorter reaction times where the reaction is not reaching completion, as can be the case with reactive extrusion, higher amounts of NaOH are likely to result in higher DS values, irrespective of the peak concentration of NaOH. The maximum DS obtained was 0.14 at a reaction efficiency of 0.39. For this study, reaching efficiency was defined as the ratio of the number of moles of SMCA reacted to form CMS to the total number of moles of SMCA used.

To evaluate cross-linking effect of STTP and citric acid on the carboxymethylation reaction in the extruder as a 2×2 factorial design involving STPP (0 and 2 g) and citric acid (0 and 2 g) was used. Another 2×2 factorial design was used to study the hypothesis that because CMS gels in the presence of water, such gelation would retard the mass transfer of reactants to the starch granules and would result in in a lower reaction rate and, hence, a lower DS during the reactive extrusion process and because CMS does not form a gel in the presence of ethanol, its presence could hypothetically give a higher DS. This design involved two levels of ethanol (0 and 20 g) and two levels of extruder barrel temperatures (80-85-85 and 95-90-85° C.). The reaction conditions for both of these designs were 500 g of corn starch, SMCA at 130 g, NaOH at 40 g, water at 40 g, and screw configuration 1. The results are summarized in Table 6, below.

TABLE 6

| T (° C.) | Citric acid (g) | STPP (g) | Ethanol (g) | DS |
|---|---|---|---|---|
| 95-90-85 | 0 | 0 | — | 0.13 |
| 95-90-85 | 0 | 2 | — | 0.15 |
| 95-90-85 | 2 | 0 | — | 0.11 |
| 95-90-85 | 2 | 2 | — | 0.13 |
| 80-85-85 | — | — | 0 | 0.08 |

TABLE 6-continued

| T (° C.) | Citric acid (g) | STPP (g) | Ethanol (g) | DS |
|---|---|---|---|---|
| 80-85-85 | — | — | 20 | 0.16 |
| 95-90-85 | — | — | 0 | 0.11 |
| 95-90-85 | — | — | 20 | 0.2 |

The effects of both STPP and citric acid were found to be significant (P<0.0005). The use of STPP might have catalyzed the reaction and increased the DS, whereas the use of citric acid seemed to reduce the rate of reaction and lowered the DS. The effect of ethanol was found to be significant (P<0.01), and its use during extrusion gave a higher DS. Hence, the presence of ethanol prevented the retardation of mass transfer of the reactants during extrusion and could be used in the formulation for higher reaction, efficiency.

Further testing was performed to determine the viability for increasing the DS above 0.2. This testing was based on the observation that the amount of NaOH used had a significant effect on the DS and the effect of the amount of H$_2$O used seemed to be approaching significance. Earlier, the maximum amount of NaOH used was 20 g. In this testing, the effects of using 40 and 50 g of NaOH and a H$_2$O content of 50 and 70 g of H$_2$O were determined in a 2×2 factorial design. For a higher DS, the amount of etherifying agent, SMCA, also was increased to 170 g, and three kneading blocks were used. The reaction conditions were 500 g of corn starch, 170 g SMCA, temperature was 80-85-85° C., and screw configuration 2. The results are set forth in Table 7, below.

TABLE 7

| NaOH (g) | Water (g) | DS |
|---|---|---|
| 40 | 50 | 0.22 |
| 40 | 70 | 0.2 |
| 50 | 50 | 0.27 |
| 50 | 70 | 0.25 |

The effects of both NaOH and H$_2$O were found to be significant. Increasing NaOH from 50 to 70 g increased the DS (P<0.005), and increasing H$_2$O from 50 to 70 g decreased the DS (P<0.05). The presence of a higher moisture content might have retarded the mass transfer to the reaction sites because of the formation of a viscous gel, resulting in a lower DS. A maximum DS of 0.27 was obtained when 50 g of H$_2$O and 50 g of NaOH were used at a reaction efficiency of 0.57. This DS was within the pharmacopoeia specifications.

The swelling behaviors of these purified carboxy methyl starches with higher DS values (0.2-0.27) were observed. All of the above samples formed lumps when added to water, and no swelling behavior was observed. This was because the high rate of absorption of water by CMS, after it had been added to water, resulted in the formation of a gel-like surface. The uncontrolled water uptake in this case might have been because of excess gelatinization of starch during the extrusion. The gel surface formed a viscous barrier that prevented any further uptake of water by CMS. This resulted in the formation of knots with a gel-like surface encapsulating dry CMS powder inside. This phenomenon is called gel blocking. The swelling behavior of CMS in water is critical for its application as a disintegrant in solid dosage forms.

To reduce the gelatinization of starch, the use of fewer kneading blocks was investigated. Using fewer kneading blocks would result in lower amounts of shear on the starch and would decrease the extent of gelatinization. The effect of epichlorohydrin on the DS and swelling behavior of CMS was also examined. Epichlorohydrin is a popular cross-linking agent. Cross-linking of CMS results in controlled uptake of water and prevents gel blocking. Because epichlorohydrin is insoluble in water, it was dissolved in ethanol and added to the formulation. The reaction conditions were 500 g of potato starch, 170 g of SMCA, 50 g of NaOH, 45 go of water, temperature of 80-85-85° C., screw configuration no. 2 for three kneading blocks and screw configuration no. 3 for two kneading blocks. The results are set forth in Table 8, below.

TABLE 8

| Epichlorohydrin (g) | No. of kneading blocks | DS |
|---|---|---|
| 2 | 2 | 0.38 |
| 0 | 2 | 0.21 |
| 2 | 3 | 0.32 |
| 0 | 3 | 0.25 |

When epichlorohydrin was used, a higher DS was obtained. However, this might have been because of the effect of the accompanying ethanol. The swelling behaviors of these carboxymethyl starches in water were observed. Despite the use of fewer kneading blocks and a cross-linking agent, gel blocking was still present. Extrusions with two kneading blocks and even higher amounts of epichlorohydrin were then performed. Gel blocking was still prevalent at 5, 10, and 15 g of epichlorohydrin.

Starch is gelatinized in an extruder by the action of moisture, heat, shear, and pressure. As discussed before, decreasing the shear by reducing the number of kneading blocks from three to two did not eliminate the gel blocking. Also, the use of epichlorohydrin as a cross-linking agent did not achieve the desired results. The temperature during extrusion cannot be reduced because it would affect the reaction rate. Also, decreasing the amount of $H_2O$ would result in a dry formulation that would plug the extruder. It was then postulated that, if a higher amount of ethanol were used, the ethanol would bind the $H_2O$, making it less available for gelatinization. Also, the earlier technique of spraying concentrated NaOH solution on the starch might have caused excess gelatinization even prior to the extrusion. Hence, instead of spraying the NaOH solution, only $H_2O$ was used, and 40-mesh NaOH beads were added separately to the formulation right before the extrusion. The number of kneading blocks was reduced to one. For 500 g of potato starch, 170 g of SMCA, 50 g of NaOH beads, and ethanol and $H_2O$ combinations of 45+45 g, 30+60 g, and 10+80 g were used and extruded using screw configuration 4 at 80-85-85° C. For the formulation with 45 g of ethanol and 45 g of $H_2O$, when 1 g of purified carboxymethyl starch was added to 30 mL of distilled water, no gel blocking was observed. The rapid water uptake resulted in rapid swelling of the sample. The DS of this sample was 0.31. For the other two formulations, no gel blocking was observed, but no significant swelling was observed either.

FTIR Spectroscopy.

Figure 6:
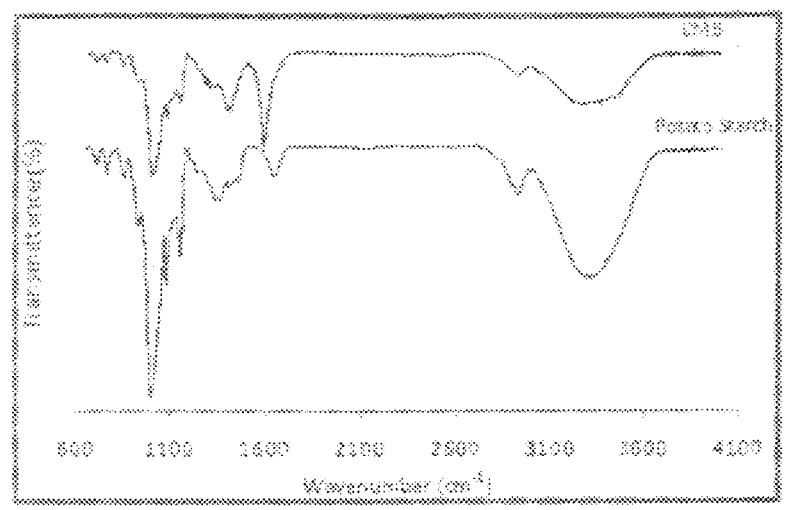
FIG. 6 is an FTIR spectra of carboxymethyl starch and native potato starch as disclosed in Example 6, below.

The FTR spectra of the carboxymethyl potato starch with a DS of 0.31 and rapid swelling properties and of native potato starch, for wavelengths from 4000 to 650 $cm^{-1}$, are shown in FIG. 6. Carboxymethylation of starch was confirmed by the beak at a wavelength of 1600 $cm^{-1}$, corresponding to the carbonyl group. The peak at 1600 $cm^{-1}$ is absent in the spectra for potato starch.

Carboxymethyl Starch Microstructure.

Figure 7:
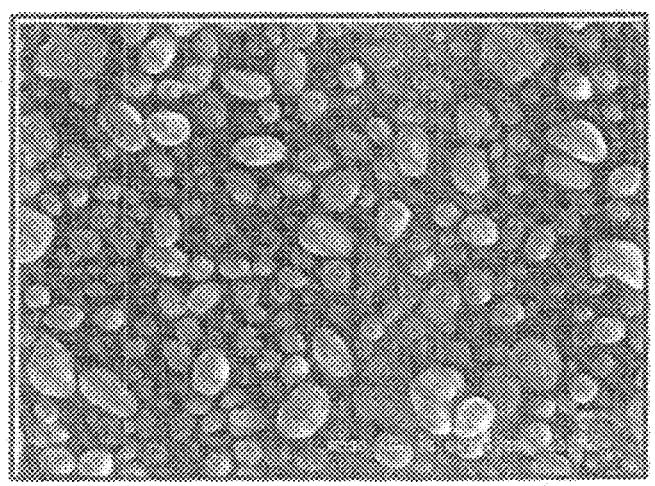
FIG. 7 is an SEM image showing the microstructure of native potato starch at 200× magnification as disclosed in Example 6, below.
Figure 8:
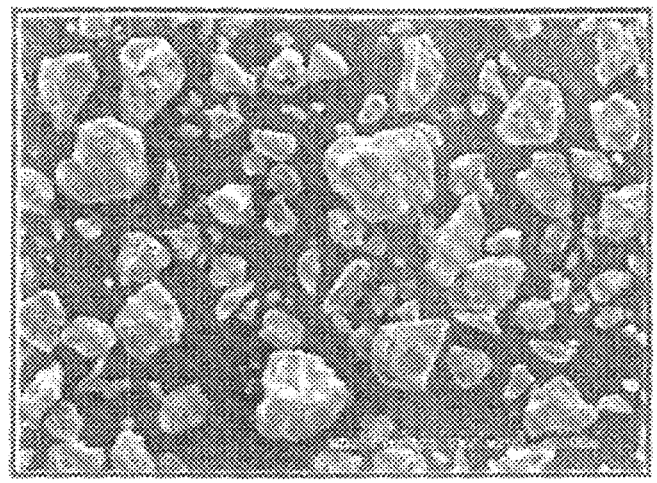
FIG. 8 is an SEM image showing the microstructure of carboxymethyl starch with DS 0.31 and rapid swelling properties at 200× magnification as disclosed in Example 6, below.
Figure 9:
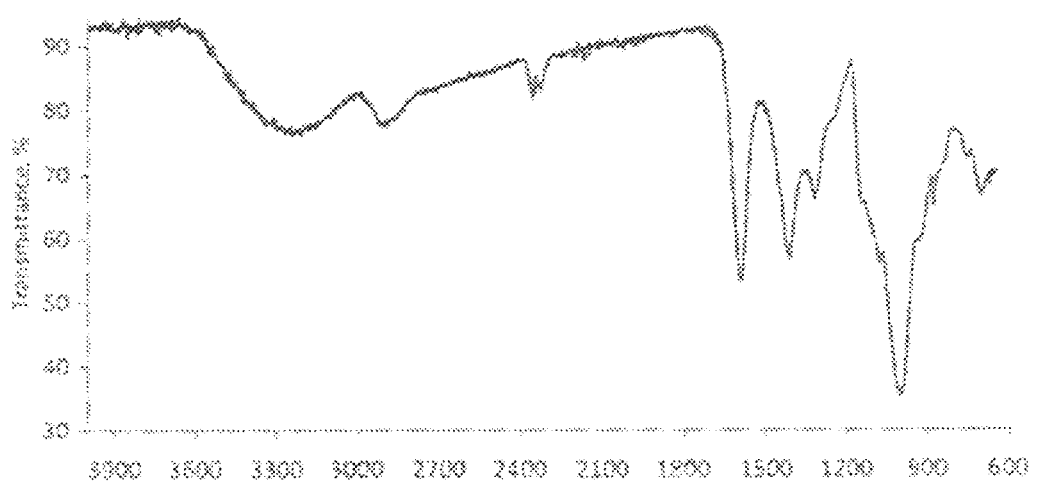
FIG. 9 is an FTIR spectra for carboxymethyl starch as disclosed in Example 7, below.

The microstructures of native potato starch and carboxymethyl potato starch with a DS of 0.31 and rapid swelling properties, obtained using a scanning electron microscope, are shown in FIGS. 7 and 8, respectively. The microstructure of potato starch shows granules with a smooth surface and sizes in the range of 20-80 µm. The granules, around 20 µm in size, were mostly spherical in shape, whereas the granules with sizes ranging from 40 to 80 µm were oval or distorted spherical in shape. The microstructure of carboxymethyl starch shows particles in the range of 20-100 µm in size along with a small amount of fines (<20 µm in size). The carboxymethyl starch particles were irregularly shaped with jagged surfaces, indicating that the granular structure of the starch was destroyed during the reactive extrusion.

Conclusions.

This study showed that the effects of NaOH, $H_2O$, and ethanol on the DS of CMS are significant. STPP, used during extrusion, might have had a catalytic effect on the carboxymethylation reaction, whereas citric acid might have had a retarding effect on the reaction. Using only one kneading block, avoiding a gelatinization of starch resulting from the use of concentrated NaOH solution, and using a cross-linking agent, carboxymethyl starch with rapid swelling properties was obtained. Using reactive extrusion, a reaction efficiency of up to 68% was obtained. Also, the reaction time in the extrusion process was extremely short as compared to that used in the conventional process. The amount of ethanol used in the formulation in this study was about 4% of the weight of starch. The amount of solvent used in the conventional slurry batch process is up to 15 times the weight of starch. Hence, in comparison, the extrusion process can be said to be a "solvent-less" process. Reactive extrusion presents a fast, efficient, and convenient continuous process for preparing cross-linked carboxymethyl starch with rapid swelling properties, suitable for application as a disintegrant pharmaceutical excipient.

Example 7

Carboxymethyl Starch

A. Materials and Methods

Materials. Corn starch with 8.8% moisture (dry basis) was mixed with 50 wt % aqueous ethanol using a liquid spray bottle. The 50% aqueous ethanol/(SMCA+starch) ratios used were based on weight of starch with 8.8% moisture. SMCA was added to the formulation and mixed using a Hobart C-100 (Hobart Corp., OH, USA) planetary mixer. The amounts of SMCA used in the formulations corresponded with the selected $DS_t$. NaOH beads were added to the formulation immediately before the extrusion such that the NaOH/SMCA ratio of 0.74 was constant for all formulations. A Brabender TSE-20 (South Hackensack, N.J., USA) co-rotating twin screw extruder was used as a reactor for the carboxymethylation reaction. The extruder was operated at a screw speed of 70 rpm without a die. The reaction formulation was fed using a Brabender PW4OPLUS-0 (Brabender Technologies Inc., Ontario, Canada) flex wall volumetric feeder at a feed rate of 20 g/min. The extruder barrel temperature was set to 80-85-85° C.

Purification and Measurement of NaCl Content.

Extruded products were ground to a fine powder using a Krups GX4100 (Millville, N.J., USA) grinder. Ground carboxymethylated starches were purified by, first, washing with anhydrous ethanol. This was followed by washing the substituted starch thrice with 90% aqueous ethanol (20:1 w/w) for 2 h each. This was followed by washing again with anhydrous ethanol. The pH of the sample was neutralized during the ethanol washings using acetic acid. After the ethanol washings, samples were dried in a vacuum oven. The dried samples were ground to pass through 100 mesh sieve. The NaCl content was then measured according to the method described by British Pharmacopoeia [15]. In a beaker, 0.5 g of carboxymethyl starch were mixed with 100 mL of distilled water along with 1 mL of nitric acid. The mixture was titrated with 0.1 M silver nitrate and the end point was determined potentiometrically. One milliliter of 0.1 M silver nitrate corresponds to 5.844 mg of NaCl.

Degree of Substitution.

The DS was measured according to the method described by British Pharmacopoeia [15]. Carboxymethyl starch (0.7 g) was refluxed in 70 mL glacial acetic acid for 2 h and then allowed to cool to room temperature. The refluxed sample was titrated using a 0.1 M solution of perchloric acid in glacial acetic acid and the end point was determined potentiometrically. One milliliter of 0.1 M perchloric acid is equivalent to 2.299 mg of Na. The analysis was replicated twice and the average of three measurements was used.

FTIR Spectroscopy.

The FTIR spectra for the carboxymethylated starches was obtained using a Smiths Detection SensIR (Danbury, Conn., USA) FTIR microscope. The FTIR microscope was used with an attenuated total reflectance (ATR) objective. The sample powder, placed on a glass slide, was pressed against the objective and analyzed directly. Sixteen scans were acquired per image at a resolution of 4 $cm^{-1}$.

Microstructure of Carboxymethyl Starch.

The microstructures of the carboxymethylated starches were examined using a Hitachi S-3000N (San Jose, Calif., USA) variable pressure scanning electron microscope. A small amount of powder was placed on a metal stub with a double sided adhesive tape. Excess powder was removed from the stub using compressed air. The carboxymethylated starches were sputter coated with gold under vacuum to render them conductive. Images of the samples were then acquired at various magnifications and at a 1280×960 pixel resolution.

XRD Analyses.

The X-ray diffractograms for the carboxymethylated starches indicated the effects of the reactive extrusion on the crystalline structure of the starches. The crystalline structure of the carboxymethylated starches was studied using a Rigaku D/Max-B X-ray diffractometer (The Woodlands, Tex., USA). X-rays were generated using a 2 kW copper target. The diffracted beam was focused on a monochromator which removed all radiations except Cu Kα wavelengths (about 1.544 Å). The detector and sample were rotated at angles of θ and 2θ respectively, with reference to the incident beam. Diffraction patterns were recorded from a diffraction angle (2θ) of 5-40° at a scan speed of 7° per minute and step size of 0.02°.

Experimental Design and Data Analyses.

There are six treatment combinations (three levels of theoretical DS×two levels of 50% aqueous ethanol/(starch+SMCA) ratio). These six treatment combinations were blocked. The numbers of kneading blocks used during extrusion were the blocking variables with three blocking levels (no kneading blocks used, 1 kneading block and 2 kneading blocks). These blocks were treated as "fixed blocks." The response variables, the DS, and reaction efficiency were analyzed using "Proc Mixed" procedure of SAS version 9.1 (SAS Institute Inc., Cary, N.C., USA) with a significance level of a 0.05.

B. Results and Discussion

FTIR Spectroscopy.

The FTIR spectra for a single sample of carboxymethyl starch, prepared using no kneading blocks at $DS_t$ 3.62 and high level of ethanol, for the wavelengths from 4000 to 650 $cm^{-1}$ are summarized in FIG. 6. The peak at a wavelength of 1600 $cm^{-1}$, corresponding to the carbonyl group, confirms the carboxymethylation of starch.

Degree of Substitution and Reaction Efficiency.

During the carboxymethylation reaction, NaCl is formed as a by-product. Also, sodium glycolate is formed in a side reaction of NaOH and SMCA. These by-products along with the excess reactant were removed by washing with ethanol. The NaCl content was checked to determine the extent of purification. The DS was determined only after the NaCl content was found to be less than 0.1% by weight of the carboxymethylated starch, since it affected the DS measurements. The DS of the carboxymethylated starches and the corresponding reaction efficiencies are summarized in Table 9, below. Here, reaction efficiency is defined as the fraction of SMCA that had reacted with starch to form carboxymethyl starch.

TABLE 9

| $DS_t$ | 50% aq. EtOH/ (SMCA + starch) | Kneading Blocks | DS | RE |
|---|---|---|---|---|
| 2.73 | 0.13 | 0 | 0.73 | 0.27 |
| 3.62 | 0.13 | 0 | 0.98 | 0.27 |
| 4.53 | 0.13 | 0 | 0.84 | 0.18 |
| 2.73 | 0.25 | 0 | 0.68 | 0.25 |
| 3.62 | 0.25 | 0 | 1.14 | 0.32 |
| 4.53 | 0.25 | 0 | 1.05 | 0.23 |
| 2.73 | 0.13 | 1 | 1.09 | 0.40 |
| 3.62 | 0.13 | 1 | 1.54 | 0.42 |
| 4.53 | 0.13 | 1 | 1.30 | 0.29 |
| 2.73 | 0.25 | 1 | 1.03 | 0.38 |
| 3.62 | 0.25 | 1 | 1.35 | 0.37 |
| 4.53 | 0.25 | 1 | 1.12 | 0.25 |
| 2.73 | 0.13 | 2 | 1.15 | 0.42 |
| 3.62 | 0.13 | 2 | 1.29 | 0.36 |
| 4.53 | 0.13 | 2 | 1.37 | 0.30 |
| 2.73 | 0.25 | 2 | 1.06 | 0.39 |
| 3.62 | 0.25 | 2 | 1.34 | 0.37 |
| 4.53 | 0.25 | 2 | 1.11 | 0.25 |

The main effects of the number of kneading blocks and SMCA/starch ratio on the DS and reaction efficiencies were found to be significant. The DS at $DS_t$ 3.62 was higher than the DS at $DS_t$ 2.73. An increase in the amount of SMCA available to starch increased the DS. However, the DS at $DS_t$ 4.53 was lower than that at $DS_t$ 3.62. In this case, it is believed that an increase in the amount of SMCA caused a decrease in the DS. The large amount of SMCA and NaOH present, relative to the amount of starch, in this case, may have resulted in a higher selectivity for the SMCA reacting with NaOH to form sodium glycolate. Consumption of the SMCA in the side reaction instead of the carboxymethylation reaction may have resulted in the low DS. Similar effects of increasing the NaOH and SMCA concentrations have been reported in slurry batch reactions. The DS at $DS_t$ 4.53 was higher than that for $DS_t$ 2.73. The reaction efficiency for $DS_t$ 4.53 was found to be lower than that for $DS_t$ 2.73 and $DS_t$ 3.62. No distinction was found between the reaction efficiency at $DS_t$ 2.73 and $DS_t$ 3.62. The DS and reaction efficiency obtained by using 1 and 2 kneading blocks was higher than that obtained when no kneading block was used. No distinction was found between the use of 1 and 2 kneading blocks. The effects of the aqueous ethanol/(starch SMCA) ratio on the DS and reaction efficiency were not significant. The highest DS and reaction efficiency obtained were 1.54 and 0.42, respectively.

Carboxymethyl Starch Microstructure.

Figure 10:
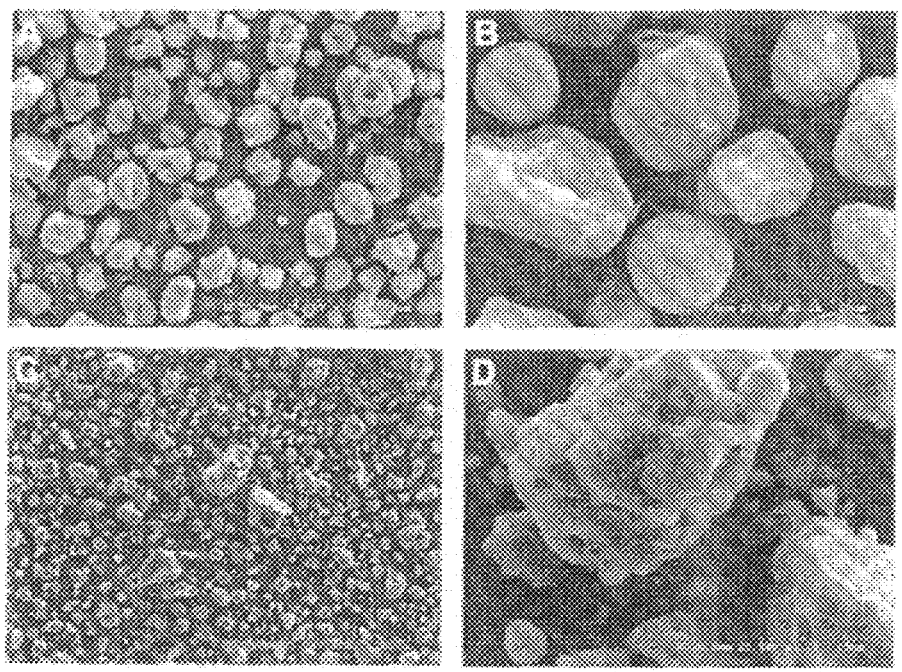
FIG. 10 contains SEM images showing the microstructure of carboxymethyl starch obtained with no kneading blocks, $DS_t$ 2.73 and (A and B) 50% aqueous ethanol/starch+SMCA ratio of 0.13 (700× and 2500× magnifications, respectively) and (C and D) 50% aqueous ethanol/starch+SMCA ratio of 0.25 (200× and 1200× magnifications, respectively) as disclosed in Example 7, below.

It has been reported that even after 80 hours of ball mill treatment of maize starch granules, the starch granules still retained their initial structures. Hence, it seems safe to assume that the milling treatment in this study was unlikely to have dramatically affected the microstructure of carboxymethyl starch in cases where the granule structure was not destroyed during extrusion. The microstructures of the carboxymethylated starches, extruded with no kneading blocks at $DS_t$ 2.73 and at both aqueous ethanol levels are shown in FIG. 10. The microstructure of the carboxymethylated starch extruded at the lower aqueous ethanol level shows particles appearing to have deformed spherical shapes and relatively smooth surfaces. Whereas, the microstructure of the carboxymethylated starch obtained at the same $DS_t$ and no kneading blocks, but at a higher level of added aqueous ethanol, showed completely, deformed granules with extremely jagged surface.

Figure 11:
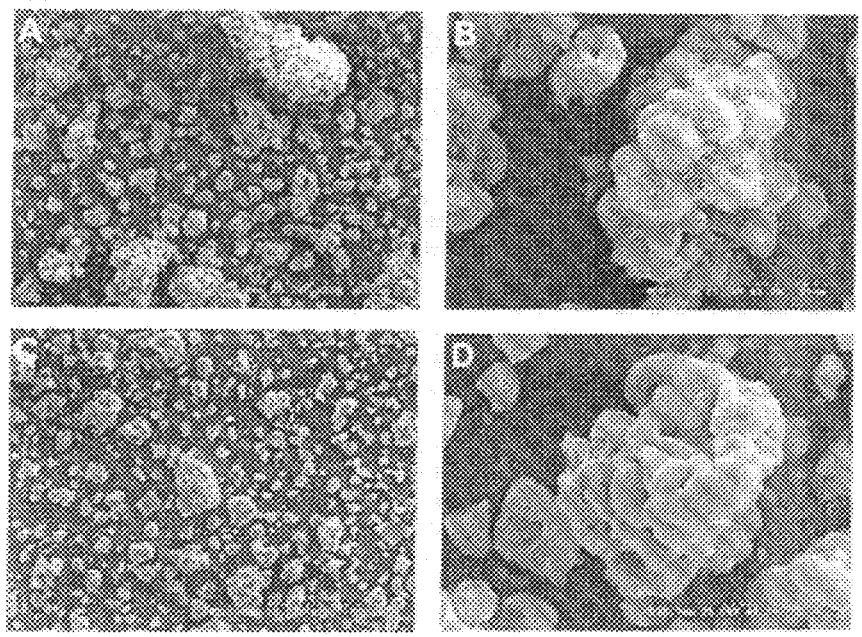
FIG. 11 contains SEM images showing the microstructure of carboxymethyl starch obtained with no kneading blocks, $DS_t$ 3.62 and (A and B) 50% aqueous ethanol/starch+SMCA ratio of 0.13 (200× and 1200× magnifications, respectively) and (C and D) 50% aqueous ethanol starch+SMCA ratio of 0.25 (200× and 1200× magnifications, respectively) as disclosed in Example 7, below.

For no kneading blocks and a $DS_t$ of 3.62, the microstructure of the carboxymethylated starch at lower aqueous ethanol level was fused spherical particles with relatively smooth surfaces, as shown in FIG. 11. In contrast, at higher aqueous ethanol levels, the microstructure revealed more deformed particles with irregular surfaces. Similarly, as observed in FIG. 12, with no kneading blocks, $DS_t$ of 4.53, and lower ethanol level the microstructure showed deformed spheres with smooth surfaces fused together, but at higher ethanol level more jagged particle surfaces were observed. These observations suggest that for no kneading blocks, at high aqueous ethanol levels; more extensive melting of the starch occurred, which gave more deformed carboxymethylated starch granules. The additional melting of starch may have been due to the additional moisture available to the starch when higher aqueous ethanol was used.

Figure 13:
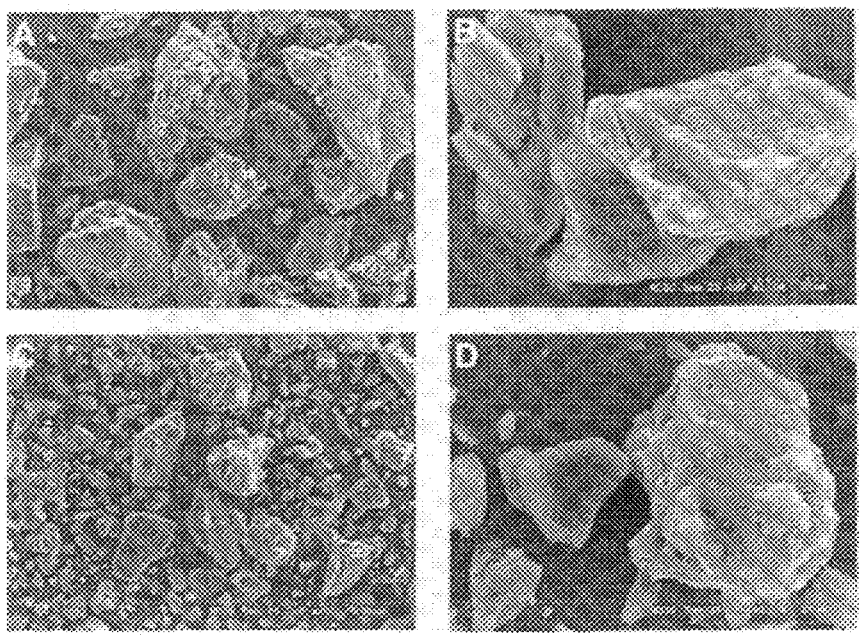
FIG. 13 contains SEM images showing the microstructure of carboxymethyl starch obtained with one kneading block, $DS_t$ 4.53 and (A and B) 50% aqueous ethanol/starch+SMCA ratio of 0.13 (200× and 1200× magnifications, respectively) and (C and D) 50% aqueous ethanol/starch+SMCA ratio of 0.25 (200× and 1200× magnifications, respectively) as disclosed in Example 7, below FIG. 14 contains SEM images showing the microstructure of carboxymethyl starch obtained with two kneading blocks, $DS_t$ 3.62 and (A and B) 50% aqueous ethanol/starch SMCA ratio of 0.13 (200× and 1200× magnifications, respectively) and (C and D) 50% aqueous ethanol/starch+SMCA ratio of 0.25 (200× and 1200× magnifications, respectively) as disclosed in Example 7, below.
Figure 14:
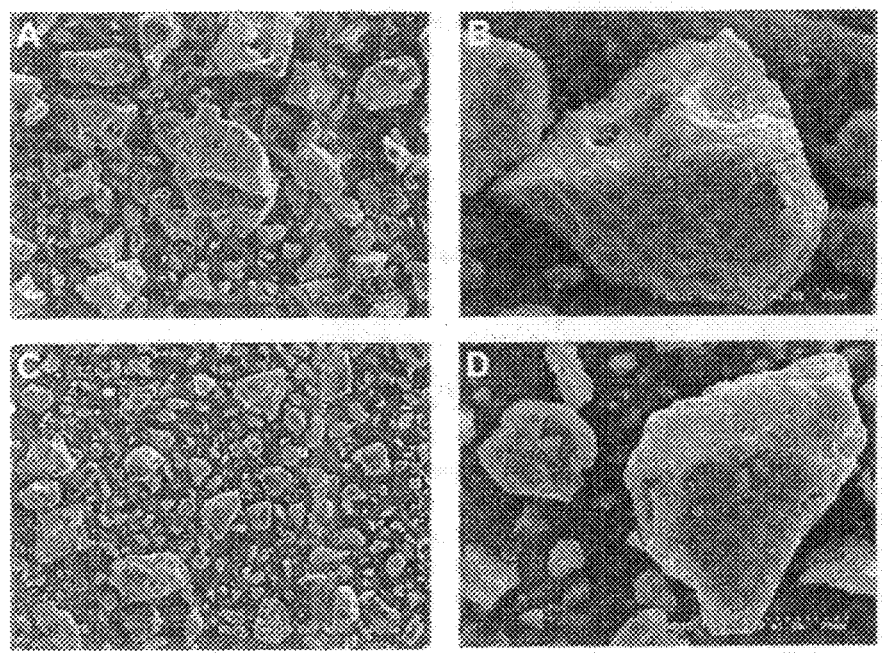

The microstructures of the carboxymethylated starches that were prepared with one kneading block (FIG. 13) and two kneading blocks (FIG. 14) showed completely deformed granules for both aqueous ethanol levels. This may have been due to the extensive melting of starch caused by the additional mechanical energy imparted by the kneading blocks.

Figure 12:
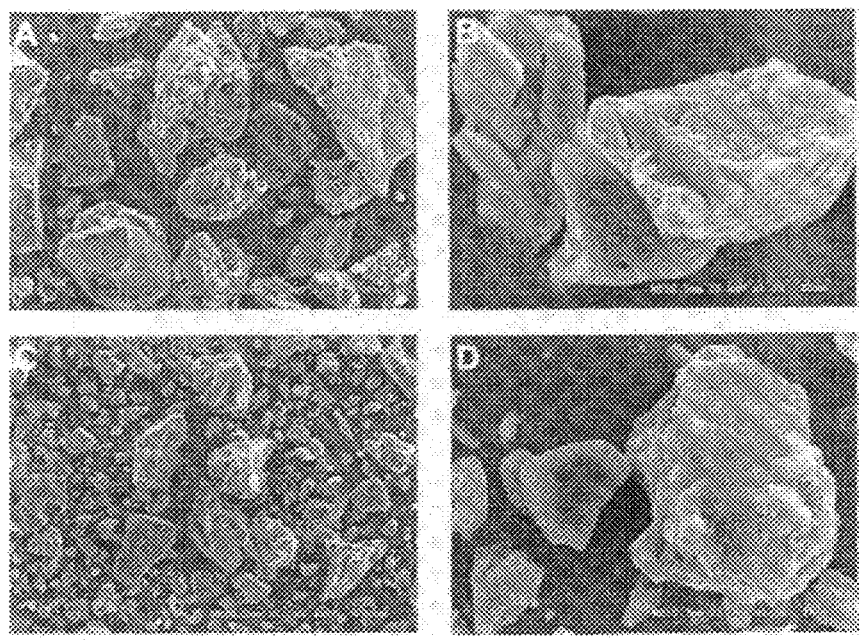
FIG. 12 contains SEM images showing the microstructure of carboxymethyl starch obtained with no kneading blocks, $DS_t$ 4.53 and (A and B) 50% aqueous ethanol/starch+SMCA ratio of 0.13 (200× and 1200× magnifications, respectively) and (C and D) 50% aqueous ethanol/starch+SMCA ratio of 0.25 (200× and 1200× magnifications, respectively) as disclosed in Example 7, below.

Thus, the observed carboxymethyl starch microstructures may be classified as granule damage without agglomeration or fusion, granule agglomeration, and complete granule fusion. Granule damage without agglomeration or fusion occurs at the mildest reaction and extrusion conditions, as observed in FIGS. 10A and B, with no kneading blocks, lowest $DS_t$ and low amount of aqueous ethanol. Granule agglomeration occurred for higher $DS_t$, but otherwise similar conditions as before. This can be seen in FIGS. 11A and B and 12A and B with higher $DS_t$ but no kneading block and low amounts of aqueous ethanol. In contrast to the first two classifications, granule fusion occurred with the use of higher amounts of aqueous ethanol, irrespective of the number of kneading blocks and $DS_t$ (FIGS. 10-12). However, it was more predominant with the use of kneading blocks (FIGS. 13 and 14), which promoted melting of the starch granules. The melting and fusion of starch granules resulted in the formation of chunks in which the starch granules were no longer discernible. It also could be noted that in cases where the granules were completely destroyed, a broad particle size distribution, and large number of fine particles were observed. These fragments may have been caused by the milling operation.

XRD Patterns.

Figure 15:
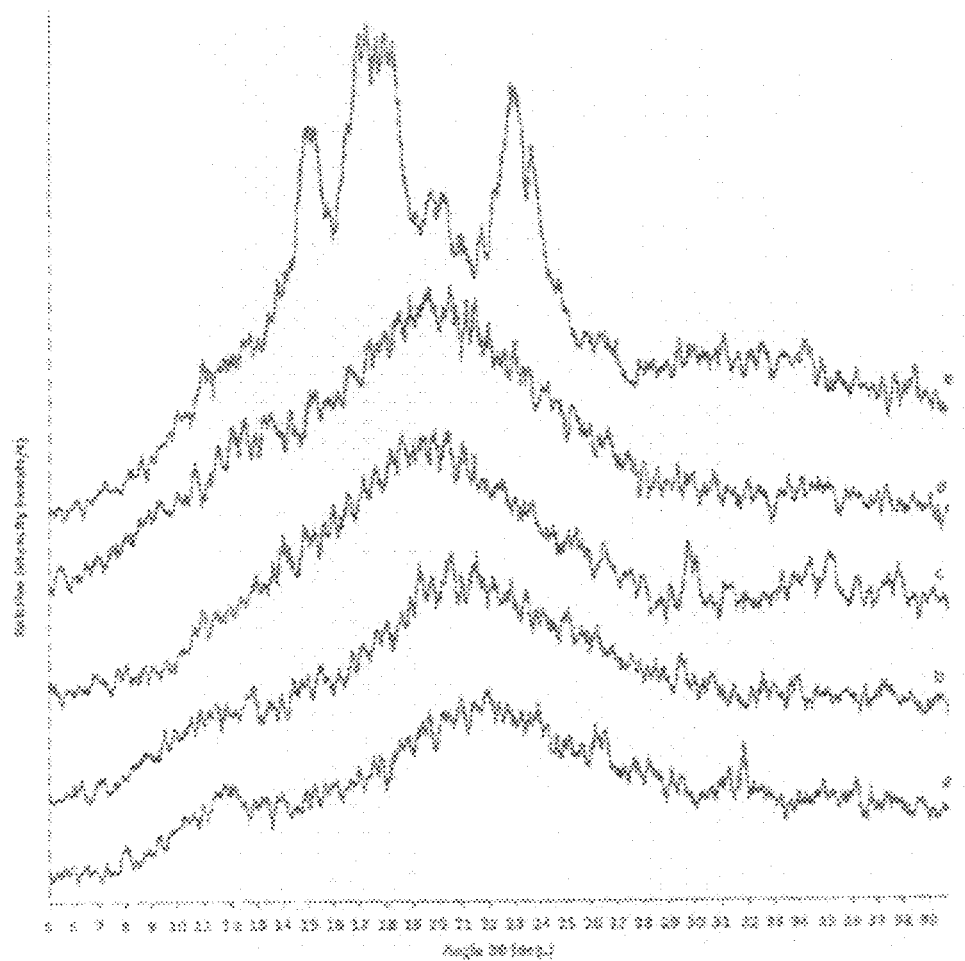
FIG. 15 shows XRD patterns for (a) one kneading block, DS, 4.53 and high ethanal level, (b) two kneading blocks, $DS_t$ 2.73 and high ethanol level, (c) no kneading blocks, $DS_t$ 2.73 with low ethanol level, (d) high ethanol level, and (e) native corn starch as disclosed in Example 7, below.

The XRD patterns for the native corn and carboxymethylated starches are presented in FIG. 15. The XRD patterns for native corn starch (FIG. 15e) shows peaks at 15°, 17°, 18°, and 23° (20). These peaks are characteristic of A-pattern crystallinity observed in cereal starches. The XRD patterns of carboxymethylated starches obtained using one kneading block (FIG. 15a) and two kneading blocks (FIG. 15b) shows the presence of a single peak around 20° and absence of the characteristic peaks observed for native corn starch. The absence of the characteristic peaks in the carboxymethylated starches indicates the substantial loss of crystallinity during the reactive extrusion process. The loss of crystallinity in carboxymethylated starches when one and two kneading blocks were used is not surprising, considering their extensive granule destruction, observed using SEM. However, even when no kneading blocks were used and at the lowest $DS_t$ of 2.73, for which there was relatively less granule damage, the XRD patterns (FIGS. 15c and d) show the absence of the characteristic peaks. This indicates a dramatic loss of crystallinity even when there was no extensive granule damage, which has been reported by others in the making of sodium carboxymethyl mungbean starches.

Conclusions.

Corn starch was reacted in a twin-screw extruder. The DS obtained increased from $DS_t$ 2.73 to $DS_t$ 3.62, but decreased at $DS_t$ 4.53. This decrease in the DS may have been due to the consumption of SMCA in a side reaction. Also, the reaction efficiency at DS, 2.73 and 3.62 was higher than that at DS, 4.53. The DS and reaction efficiency when one and two kneading blocks were used was found to be higher than that for no kneading blocks. No significant effect of the use of aqueous ethanol on the DS was found. Also, experimental conditions strongly influenced the product morphology. The microstructure of the carboxymethylated starch revealed that when using no kneading blocks, using lower amount of aqueous ethanol better preserved the granular structure of starch was better preserved. For other conditions granule agglomeration or granule fusion was observed. Overall, the maximum DS and reaction efficiency obtained were 1.54 and 0.42, respectively.

Example 8

Carboxymethyl Cellulose

Cotton linter pulp sheets (Grade UVE ($DP_w$=7077 and viscosity=14,000 s), Buckeye Technologies Inc., Memphis, Tenn.) were cut, using a sheet cutter, into 15×15 mm pieces and then shredded to a fluff using a blender (Model 31BL92, Waring Products Limited, New Hartford, Conn.). Sodium hydroxide (Thermo Fisher Scientific, Hampton, N.H.) solution in aqueous ethanol (USP grade, Decon Labs, King of Prussia, Pa.) or distilled water, cooled to 15° C., was added to the cellulose fluff under nitrogen atmosphere and shredded in the blender for 5 min. Powdered SMCA (Alfa Aesar, Ward Hill, Mass.) was then added to the alkali cellulose and the formulation was again shredded in the blender, under nitrogen atmosphere. The formulation was then mixed in a planetary mixer (model C-100, Hobart Corp., Ohio) and sealed in plastic bags, with nitrogen maintaining an inert atmosphere, and stored at 25° C. for 7 hours for mercerization.

A co-rotating twin-screw extruder (model TSE-20, Brabender Technologies Inc., South Hackensack, N.J.) with 4 heating zones and an injection port in the barrel was used as a reactor for carboxymethylation of cellulose. The extruder was operated without a die because of the fibrous and non-thermoplastic nature of cellulose. The screw configuration used consisted of 4 kneading blocks and 9 compression screws and is detailed in Table 10.

TABLE 10

| No. of screw elements (from die end) | Element Type | Element length (mm) |
| --- | --- | --- |
| 9 | Compression | 20 |
| 3 | Conveying | 30 |
| 1 | Conveying | 15 |
| 1 | Kneading | 20 |
| 2 | Conveying | 30 |
| 1 | Kneading | 20 |
| 1 | Conveying | 30 |
| 1 | Kneading | 20 |
| 6 | Conveying | 30 |

The formulation was hand fed to the second zone and forced in the extruder using a plastic plunger. The barrel temperature for the feed zone was set at 100° C. and the barrel temperature for both the subsequent zones were set at 150° C. On the die end of the extruder, a 80×80×900 mm vertical steel tube, with continuous nitrogen flow, was attached. The extrudates leaving the extruder, dropped through the steel tube under nitrogen atmosphere, and were collected in a plastic bag attached to the lower end of the steel tube. The extrudates were sealed in the plastic bags with a nitrogen atmosphere until further processing.

Extrudate Purification.

The extrudates were ground using a blender (model F203, Krups USA) and purified of the byproducts by centrifuging its suspension in 80% aqueous ethanol using a Baxter MEGAFUGE (model 2.0R, Heraeus Instruments Inc., South Plainfield, N.J.) at 4000 rpm. The aqueous ethanol was periodically replaced. The pHs of the extrudates were neutralized by adding glacial acetic acid to the ethanol. The extrudates were centrifuged until the NaCl content was found to have been reduced below 0.1 wt %. The NaCl content was measured by potentiometric titration with 0.1 M silver nitrate and has been described elsewhere. The extrudates were finally washed with anhydrous ethanol and dried overnight in a vacuum oven. The purified extrudates were ground so as to pass through a Tyler Standard Series number 70 mesh.

FTIR Spectroscopy.

The Fourier-transform Infrared (FTIR) spectra for the carboxymethyl cellulose was obtained using a Smiths Detection SensIR (Danbury, Conn.) FTIR microscope. The FTIR microscope was used with an attenuated total reflectance (ATR) objective. The sample powder, placed on a glass slide, was pressed against the objective and analyzed directly. Sixteen scans were acquired per image at a resolution of 4 cm$^{-1}$.

X-Ray Diffraction.

X-ray diffraction studies were conducted using a Rigaku D/Max-B diffractometer (Rigaku Americas, The Woodlands, Tex.). X-rays, produced using a 2 kW copper target, were converged into a monochromator which removed all radiations except the Cu Kα wavelength (~1.544 Å). The samples were uniformly sprinkled on glass slides covered with vacuum grease (Dow Corning, Midland, Mich.) which were then inserted in the diffractometer. The sample and the detector were rotated at angles θ and 2θ with respect to the incident beam. Diffractograms were registered for the angular range (2θ) of 5° to 35°, with a scanning speed of 5° (2θ)/minute and a step size of 0.02° (2θ). The degree of crystallinity was determined using the equation $X=n*I_k/I_o$, n=0.75. Here, $I_o$ is the intensity of the maximum diffraction from the baseline and $I_k$ is intensity obtained by subtracting the base level from $t_o$ (Zhang, Li, Zhang, & Shi, 1993). The fraction of cellulose-II crystalline form present in the carboxymethyl cellulose was calculated using the equation $X_{II}=X(1-C_{II})$, where $C_{II}$ is the fraction of cellulose-II in the crystalline aggregation and is calculated as $C_{II}=I_{12}/[I_{12}+0.5(I_{14.7}+I_{16.1})]$. Here, $I_{12}$, $I_{14.7}$ and $I_{16.1}$ are the intensities at 2θ angles of 12°, 14.7°, and 16.1°, respectively, in the diffractogram, and they were determined as indicated by Zhang, Li, Zhang, and Shi (1993).

Degree of Substitution.

The degrees of substitutions were determined using the method described by US Pharmacopoeia NF24. In a crucible, which was previously ignited at 600° C. for 30 minutes, then cooled in a desiccator and weighed, 1 g of carboxymethyl cellulose was added. The sample was moistened with 1 mL of dilute sulfuric acid (50 wt %) and then the crucible was heated on a flame until the cellulose was completely charred. After the sample had cooled down, it was again moistened using 1 mL sulfuric acid and ignited in a muffle furnace at 600° C. for 3 hours. The crucible was cooled in a desiccator, weighed and the percentage of residue was calculated. The moistening with sulfuric acid and igniting was repeated until constant percentage of residue was obtained. The Na in sodium carboxymethyl cellulose was assayed using the equation % Na=0.3238 A, where A is the percentage of sulfated ash residue obtained on ignition. The % Na assay was converted to DS using the equation DS=[(% Na/2300)×162]/[1−((% Na/2300)×80)]. The measurements were replicated once.

Capillary Liquid Uptake.

The set-up for capillary liquid uptake measurements consisted of a graduated glass burette that was connected, through a tube, to a Millipore (Billerica, Mass.) 47 mm filter setup consisting of a fritted glass filter plate. The position of the fritted filter plate was adjusted so that the test liquid (1% w/v NaCl solution) in the graduated burette is at level with it and the liquid barely touches the fritted plate. Any kinks present in the tube and any air bubbles present in the tube or under the fritted plate were removed. The powdered extrudate (0.2 g) was spread uniformly on the sintered glass plate. The test liquid passed through the tube and fritted plate by capillary action and was then absorbed by the extrudates. The liquid level in the burette was noted periodically and the rate of water uptake by the extrudates was determined. The measurements were replicated once. Similarly, water uptakes were also determined for AQUASORB A500 (Carboxymethyl cellulose, Ashland Aqualon Functional Ingredients, Wilmington, Del.) and cross-linked sodium polyacrylate (The Ark Enterprises, Inc., Missouri).

Water Absorption—Flood Method.

Carboxymethyl cellulose (0.2 g) was immersed in 20 ml of 1% NaCl solution, in a beaker. After soaking for 30 minutes, the suspension was filtered using a 60 mesh (Tyler standard series) sieve and the filtrate was collected in a measuring cylinder. The unabsorbed liquid was measured and the absorbency (ml of liquid absorbed) was calculated. The measurements were replicated once. Water absorptions were also determined for AQUASORB A500 and sodium polyacrylate.

Water Absorption—Centrifuge Method.

Carboxymethyl cellulose (0.2 g) was immersed in 20 ml of 1% NaCl solution for 30 minutes and then centrifuged using a Baxter MEGAFUGE 2.0R (Heraeus Instruments Inc., South Plainfield, N.J.) for 2 minutes at 1800 g. The suspension was then filtered using a 60 mesh sieve and the absorbency was determined. Using the absorbency before and after centrifugation, the % retention after centrifugation was also calculated. The measurements were replicated once. Water absorption using this method was also determined for AQUASORB A500 and sodium polyacrylate.

Scanning Electron Microscope.

A variable pressure scanning electron microscope (model S-3000N, Hitachi High Technologies America Inc., San Jose, Calif.) was used to determine the product microstructures. A small amount of the powdered and purified extrudate was placed on a metal stub with a double sided adhesive tape. The powdered extrudate was then sputter coated with gold under vacuum, in order to render them conductive. Images were obtained at 1280×960 pixel resolution and 120× and 900× magnifications.

Experimental Design and Data Analyses.

There were fifteen treatment combinations (5 levels of water:ethanol ratio×3 levels of NaOH). These fifteen treatment combinations were blocked and replicated twice. The data on the degrees of substitutions, capillary water uptakes and water absorptions using flood and centrifuge methods were analyzed using 'Proc Mixed' procedure of SAS version 9.1 (SAS Institute Inc., Cary, N.C.) with a significance level of $\alpha \leq 1.05$.

FTIR Spectroscopy.

Figure 16:
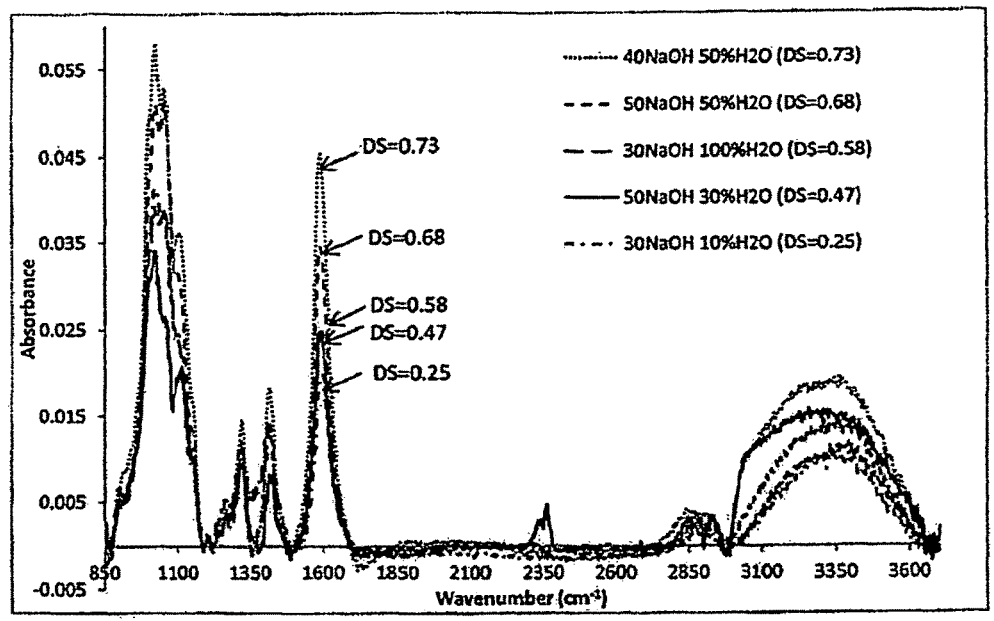
FIG. 16 show FTIR spectra of carboxymethyl cellulose as disclosed in Example 8, below.

The FTIR spectra for purified carboxymethyl celluloses for the wave-numbers 850-3500 $cm^{-1}$ are summarized in FIG. 16. The peaks corresponding to the backbone of the cellulose molecule are observed at 3432 $cm^{-1}$ (broad absorption band due to stretching of —OH groups and intermolecular and intramolecular hydrogen bonds), 2920 $cm^{-1}$ (C—H stretching), 1420 $cm^{-1}$ (—$CH_2$ scissoring), 1320 $cm^{-1}$ (—OH bending) and 1060 $cm^{-1}$ (CH—O—$CH_2$ stretching) (Pushpamalar, Langford, Ahmad, & Lim, 2006). The peak at 1600 $cm^{-1}$ confirms the carboxymethylation of cellulose.

X-Ray Diffraction.

Figure 17:
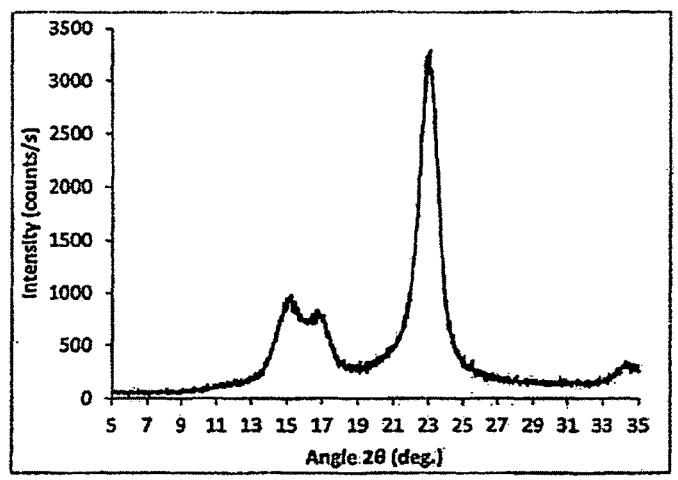
FIG. 17 shows the X-ray diffraction pattern for cotton linter pulp as disclosed in Example 8, below.
Figure 18:
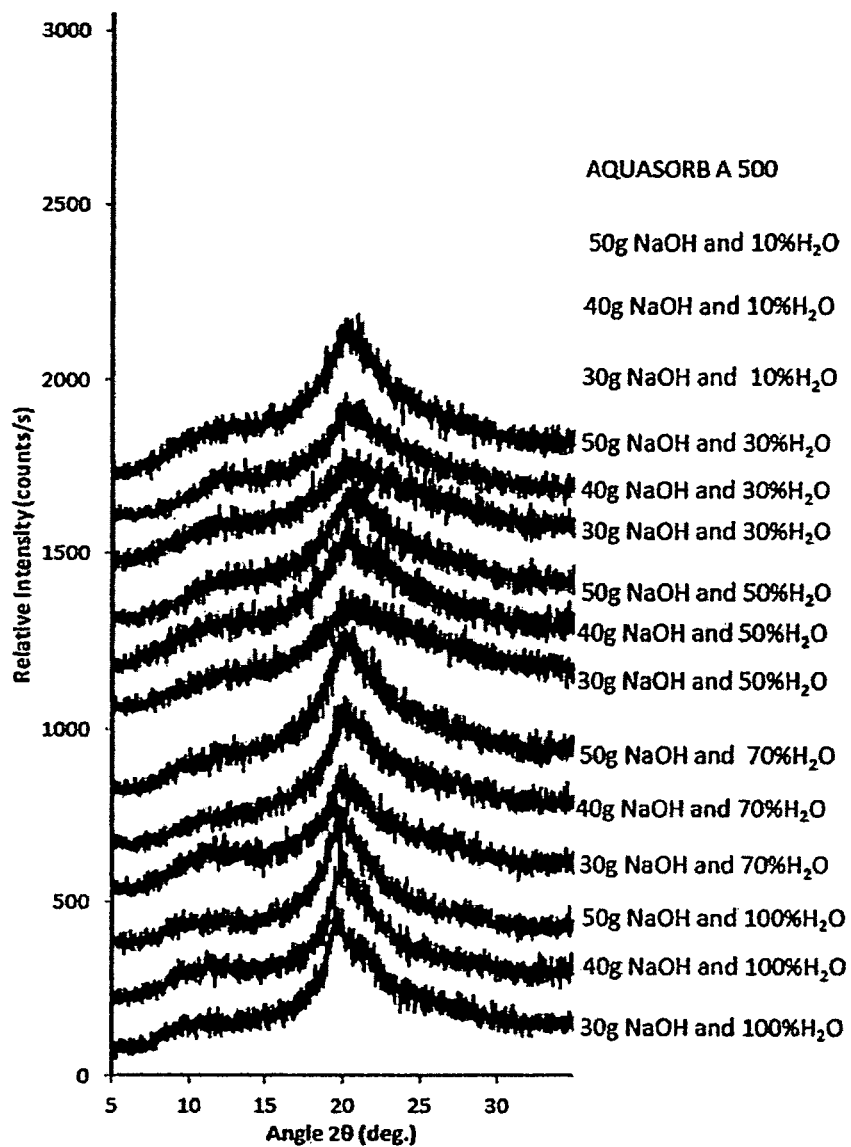
FIG. 18 shows X-ray diffraction patterns for AQUASORB A 500 and carboxymethyl cellulose prepared as disclosed in Example 8, below.

The x-ray diffractogram for cotton linter pulp and carboxymethyl cellulose have been presented in FIGS. 17 and 18, respectively. The x-ray diffractogram of cotton linter pulp, illustrated in FIG. 17, shows the characteristic peaks of cellulose-I crystalline structure at 14.7°, 16.1°, 22.4° and 34.2°. While, in the x-ray diffractograms of carboxymethyl cellulose and AQUASORB A500, illustrated in FIG. 18, the peaks at 14.7°, 16.1° and 22.4° disappeared and peaks at 12°, 20° and 21.5°, characteristic of cellulose-II crystalline structure, appeared (Zhang, Li, Zhang, & Shi, 1993). This indicates that during mercerization, prior to the carboxymethylation process, destruction of cellulose-I crystalline structure and formation of cellulose-II crystalline structure took place. During this metamorphosis, the NaOH solution penetrates the amorphous regions interspaced between the crystalline regions which results in the formation of Na cellulose-I with anti-parallel chains, effecting a gradual reduction of cellulose-I crystallinity which leads to the formation of Na cellulose-I crystallites. Na cellulose-I is then able to absorb more alkali and is converted to Na cellulose-II which after washing and drying gets converted to cellulose-II (El Oudiani, Chaabouni, Msahli, & Sakli, 2010). Thus, cellulose-II crystalline form is regenerated from amorphous cellulose. During this regeneration, small amounts of cellulose-I is also regenerated (Yokota, 1985).

Table 11, below, summarizes the degrees of crystallinity (X) and the cellulose-II crystalline fraction in the sample ($X_{II}$) for carboxymethyl cellulose, AQUASORB A500, and cotton linter pulp. Cotton linter pulp has a high degree of crystallinity (0.7), which is also apparent from the high intensity of the peak at 22.4° in the diffractogram (FIG. 17), and no cellulose-II crystalline aggregation. AQUASORB A500 has a degree of crystallinity and fraction of cellulose-II crystalline aggregate of 0.37 and 0.12, respectively. Carboxymethyl cellulose prepared using reactive extrusion had degrees of crystallinity ranging from 0.18 to 0.51 and cellulose-II crystalline fraction ranging from 0.14 to 0.36. Carboxymethyl cellulose prepared with 100% $H_2O$ seemed to have the highest degree of crystallinity and cellulose-II crystalline fraction, ranging from 0.43 to 0.51, and 0.27 to 0.36, respectively.

TABLE 11

| Sample | DS | RE (%) | X | $X_{II}$ |
|---|---|---|---|---|
| 30NaOH 100% H2O | 0.56 | 20.12 | 0.43 | 0.27 |
| 40NaOH 100% H2O | 0.43 | 15.61 | 0.48 | 0.36 |
| 50NaOH 100% H2O | 0.46 | 16.37 | 0.51 | 0.30 |
| 30NaOH 70% H2O | 0.60 | 21.69 | 0.36 | 0.15 |
| 40NaOH 70% H2O | 0.60 | 21.57 | 0.36 | 0.18 |
| 50NaOH 70% H2O | 0.55 | 19.94 | 0.35 | 0.20 |
| 30NaOH 50% H2O | 0.70 | 25.29 | 0.20 | 0.15 |
| 40NaOH 50% H2O | 0.73 | 26.27 | 0.29 | 0.23 |
| 50NaOH 50% H2O | 0.56 | 20.31 | 0.27 | 0.19 |
| 30NaOH 30% H2O | 0.72 | 25.77 | 0.18 | 0.14 |
| 40NaOH 30% H2O | 0.55 | 19.93 | 0.26 | 0.23 |
| 50NaOH 30% H2O | 0.48 | 17.29 | 0.33 | 0.26 |
| 30NaOH 10% H2O | 0.30 | 10.64 | 0.43 | 0.34 |
| 40NaOH 10% H2O | 0.22 | 7.84 | 0.36 | 0.21 |
| 50NaOH 10% H2O | 0.10 | 3.46 | 0.34 | 0.22 |
| AQUASORB A500 | 0.70 | — | 0.37 | 0.12 |
| Cotton Linter Pulp | — | — | 0.70 | 0.0 |

The average degrees of crystallinity and cellulose-II fraction at 70% $H_2O$ (0.36 and 0.18), 50% $H_2O$ (0.25 and 0.19), 30% $H_2O$ (0.26 and 0.21) and 10% $H_2O$ (0.38 and 0.21) were lesser than that for 100% $H_2O$ (0.47 and 0.31). In this study, at high alcohol concentrations, 2-phase solutions and insoluble NaOH were observed which may have resulted in lower crystallinity at higher alcohol concentrations. The average degree of crystallinity, in this study, increased slightly with increasing amounts of NaOH from 30 g NaOH (0.32) to 40 g NaOH (0.35) and 50 g NaOH (0.36).

Degree of Substitution.

The degrees of substitutions of carboxymethyl cellulose are summarized in Table 12. Statistical analysis of the degree of substitution revealed a significant interaction between NaOH and $H_2O$ (P=0.0308), suggesting that the effect of one experimental variable was dependent on the level of the other. The effect of the amount of $H_2O$ used is significant at all levels of NaOH (P<0.0001). The effect of NaOH is not significant when 70% $H_2O$ is used (P=0.4725) but is significant for all other levels of $H_2O$.

TABLE 12

| Sample | Absorption (ml) | Absorption after centrifuge (ml) | Retention (%) |
|---|---|---|---|
| 30NAOH 100% H2O | 9.3 | 8.3 | 89.3 |
| 40NAOH 100% H2O | 9.8 | 8.7 | 88.1 |
| 50NAOH 100% H2O | 9.8 | 8.8 | 89.0 |
| 30NAOH 70% H2O | 15.5 | 9.0 | 58.1 |

TABLE 12-continued

| Sample | Absorption (ml) | Absorption after centrifuge (ml) | Retention (%) |
|---|---|---|---|
| 40NAOH 70% H2O | 13.8 | 8.5 | 61.8 |
| 50NAOH 70% H2O | 13.7 | 12.3 | 90.2 |
| 30NAOH 50% H2O | 8.8 | 7.0 | 79.2 |
| 40NAOH 50% H2O | 7.7 | 6.2 | 80.4 |
| 50NAOH 50% H2O | 8.3 | 8.2 | 98.0 |
| 30NAOH 30% H2O | 9.3 | 7.3 | 78.4 |
| 40NAOH 30% H2O | 6.7 | 5.7 | 85.0 |
| 50NAOH 30% H2O | 7.0 | 6.5 | 92.9 |
| 30NAOH 10% H2O | 3.5 | 2.3 | 66.7 |
| 40NAOH 10% H2O | 4.2 | 2.0 | 48.0 |
| 50NAOH 10% H2O | 2.7 | 1.0 | 37.5 |
| AQUASORB A500 | 13.0 | 8.0 | 61.5 |
| Sodium Polyacrylate | 10.0 | 9.8 | 97.5 |

When the amount of NaOH used was increased from 30 g to 40 g there was a significant decrease in the DS at 100% and 30% $H_2O$, and when the NaOH was further increased from 40 g to 50 g there was significant decrease in DS at 50% and 10% $H_2O$. At all other levels of $H_2O$ there were no significant differences. The decrease in DS with an increase in NaOH concentration, above a critical NaOH concentration was also observed during carboxymethylation of starch using reactive extrusion. The effect of NaOH concentration on the DS may have been due to the predomination of the side reaction, resulting in the formation of sodium glycolate, over the carboxymethylation reaction, at high NaOH concentrations.

The $H_2O$/ethanol compositions also affected the DS. When the $H_2O$ content decreased from 100% to 70%, the increase in DS was found to be significant when 40 g (P=0.0014) and 50 g (P=0.0484) NaOH were used but not when 30 g NaOH was used (P=0.3276). With a further decrease in $H_2O$ content from 70% to 50%, the DS again increased which was found to be significant when 30 g (P=0.0484) and 40 g (P=0.0097) NaOH were used but not when 50 g NaOH was used (P=0.7780). With further decrease in $H_2O$ content from 50% $H_2O$ to 30% $H_2O$, the DS increased at 40 g NaOH (P=0.0008) but no difference was found at 30 g (P=0.7780) and 50 g (P=0.0748) NaOH. Also, when $H_2O$ content was decreased from 30% $H_2O$ to 10% $H_2O$, the DS decreased for all values of NaOH (P<0.0001). The DS at 30% $H_2O$ was higher that at 100% $H_2O$ and found significant at 30 g (0.0024) and 40 g (0.0161) NaOH. The DS at 10% $H_2O$ was lower than that at 100% $H_2O$ at all levels of NaOH (P<0.0001).

The high DS at 70%, 50% and 30% $H_2O$, in general, was found to be higher than that at 100% $H_2O$. This may have resulted because of the lower degrees of crystallinity and fractions of cellulose-II crystalline forms at 70% (0.36, 0.18), 50% (0.25, 0.19) and 30% (0.26, 0.21) $H_2O$ as compared to 100% $H_2O$ (0.47, 0.31). Cellulose-II crystalline form, especially, is compact and difficult for the reactants to penetrate, resulting in a lower rate of carboxymethylation (Zhang, Li, Zhang, & Shi, 1993). However, despite the lower degree of crystallinity and cellulose-II crystalline fraction at 10% $H_2O$ (0.38, 0.26), its DS was not higher than that at 100% $H_2O$.

The presence of ethanol may have also contributed to the higher DS by reducing the water binding tendency of carboxymethyl cellulose and hence facilitating better reactant penetration. The highest DS (0.73) was obtained at a 50% $H_2O$ concentration when 40 g NaOH was used (reaction efficiency (RE) of 26.3%).

The DS increased with decrease in $H_2O$ content from 100% to 70%, when the amount of NaOH used was 40 g (p=0.0014) and 50 g, and 70% to 50% (P=0.0062), but decreased when the $H_2O$ content decreased from 50% to 30% (P=0.0046) and 30% to 10% (P<0.0001). The DS obtained at 100% $H_2O$ was lower than that obtained at 30% $H_2O$ (P=0.0009) but higher than that at 10% $H_2O$ (P<0.0001).

Liquid Uptake.

Figure 19:
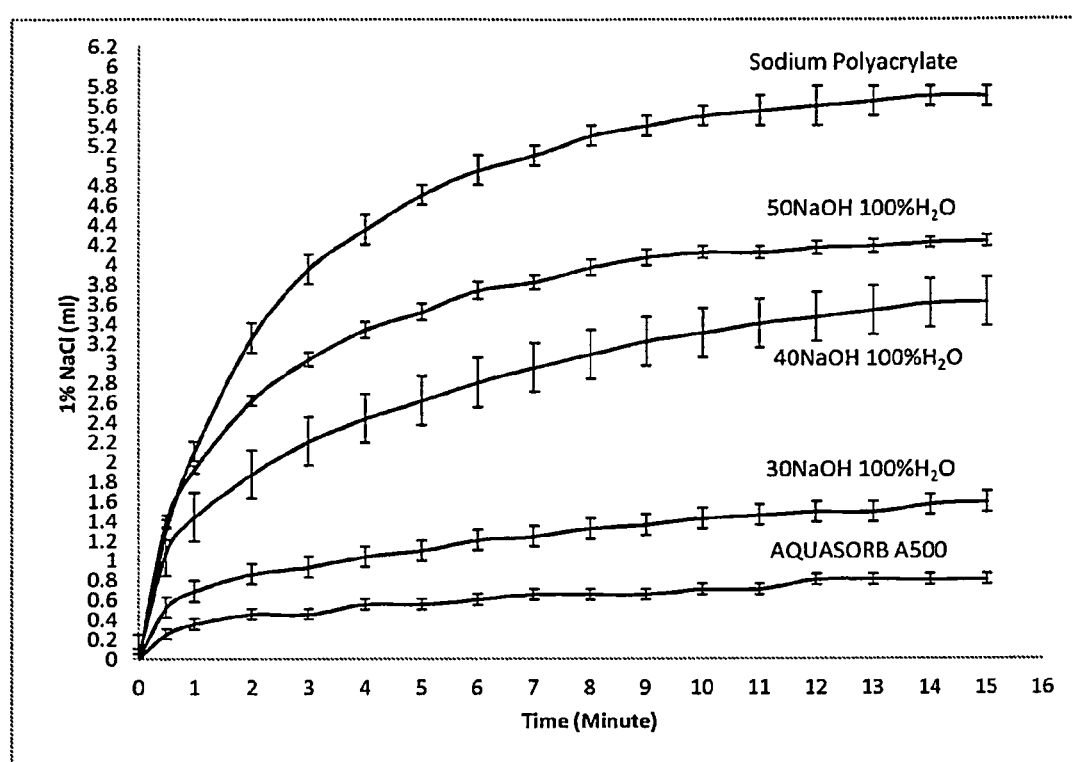
FIG. 19 shows water uptake measurements for carboxymethyl cellulose prepared using differing concentrations of NaOH and 100% $H_2O$, AQUASORB A 500, and sodium polyacrylate as disclosed in Example 8, below.
Figure 20:
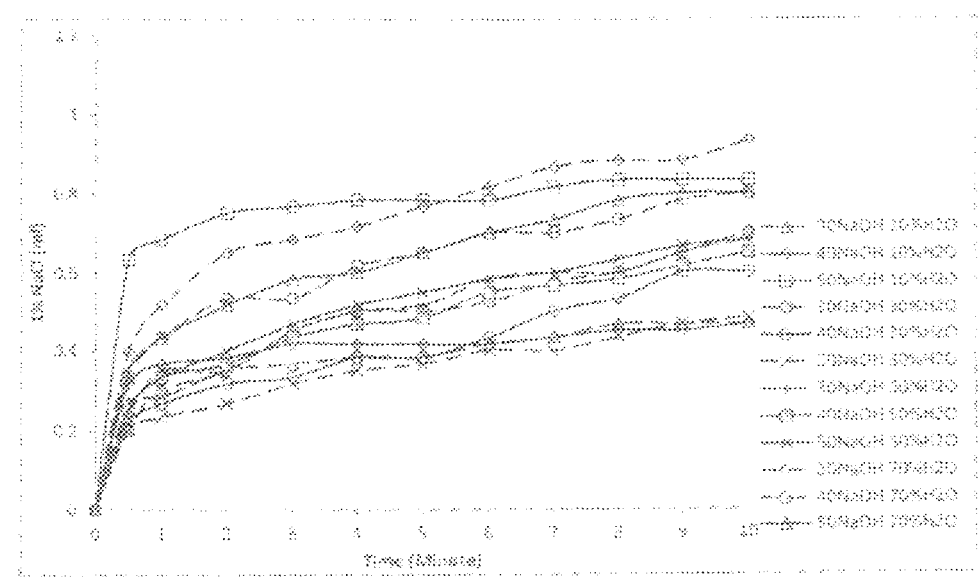
FIG. 20 shows water uptake measurements of carboxymethyl cellulose prepared using differing concentrations of NaOH and $H_2O$ as disclosed in Example 8, below.

The rates of liquid uptake for carboxymethyl cellulose, AQUASORB A500 and sodium polyacrylate are illustrated in FIGS. 19 and 20. The liquid uptake for carboxymethyl cellulose prepared with 100% H2O seemed to be higher in rate and extent than those prepared with 70, 50, 30 and 10% H2O and AQUASORB A500. However, statistical analysis revealed that there was no significant difference between the liquid uptake for carboxymethyl cellulose prepared with 30 g NaOH+100% H2O and 50 g NaOH+10% H2O and 30 g NaOH+70% H2O at intervals of 1 minute (P=0.9358, P=0.4696) and 5 minutes (P=0.1599, P=0.1378) and also between 30 g NaOH+100% H2O and 40 g NaOH+70% H2O, 50 g NaOH+70% H2O and AQUASORB A500 at a time period of 1 minute (P=0.2621, P=0.2621, P=0.1083). However, the liquid uptake of carboxymethyl cellulose prepared with 40 g and 50 g NaOH+100% H2O was statistically found to be higher than those prepared with 70, 50, 30 and 10% H2O and AQUASORB A500 at all time periods.

The liquid uptakes for 50 g NaOH+100% $H_2O$, at intervals of 1, 5 and 10 minute(s), were statistically higher than those for 40 g NaOH+100% $H_2O$ (P=0.0224, P<0.0001, P=0.0002), which in turn were higher than those for 30 g NaOH+100% $H_2O$ (P=0.0004, P<0.0001, P<0.0001). The highest rate and extent of liquid uptake, for carboxymethyl cellulose, was obtained at 50 g NaOH+100% $H_2O$ with absorption of 4.2 ml (21 ml/g) 1% NaCl solution after 15 minutes. However, this was found to be lower than the extent of water uptake of sodium polyacrylate, a synthetic superabsorbent, at 5 (P<0.0001), 10 (P<0.0001) and 15 minutes (P<0.0001), while no difference was found at 1 minute (P=0.3494). Sodium polyacrylate had an impressive rate and extent of water absorption with an absorption capacity of 5.7 ml (28.5 ml/g) 1% NaCl after 15 minutes.

During the early stages of liquid uptake, carboxymethyl cellulose, prepared with 70%, 50% and 30% $H_2O$, began forming a viscous mass after absorbing water which acted as a barrier between the filter plate and some of the still dry, powder mass. Even after large time intervals (~10 min.), a significant amount of carboxymethyl cellulose powder remained dry because of this viscous barrier. This phenomenon, called gel blocking, seriously limited the liquid uptake for carboxymethyl cellulose prepared at these conditions. Carboxymethyl cellulose prepared using 10% $H_2O$ did not exhibit gel blocking, but had low rates and extents of water absorptions due to low absorption power, likely to have resulted from the lower DS. The higher rate and extent of water uptake by carboxymethyl cellulose, prepared with 100% $H_2O$, may have been because of its higher degrees of crystallinity. Cellulose crystallites are rendered insoluble by the presence of hydrogen bonds. The lower solubility of this carboxymethyl cellulose may have contributed in preventing the formation of a viscous barrier, which permitted a rapid rate of water uptake.

Water Absorption.

The water absorption capacities for carboxymethyl cellulose, AQUASORB A500 and sodium polyacrylate have been presented in Table 12, above. Statistical analysis reveal a significant effect of the H₂O:ethanol ratio on the water absorption before and after centrifugation ($P<0.0001$). No difference was found in the absorption using 100% $H_2O$ and 50% $H_2O$ ($P=0.0702$) and between 50% $H_2O$ and 30% $H_2O$ ($P=0.3740$) before centrifugation and between the use of 100% $H_2O$ and 70% $H_2O$ ($P=0.0904$) and again between 50% $H_2O$ and 30% $H_2O$ ($P=0.3416$) after centrifugation. The highest absorption before centrifugation was obtained by carboxymethyl cellulose prepared with 30 g NaOH+70% $H_2O$ (15.5 ml), however after centrifugation carboxymethyl cellulose prepared with 50 g NaOH+70% $H_2O$ had the highest absorption (12.3 ml). The highest retention was obtained at 50 g NaOH+50% $H_2O$ (98%). AQUASORB and sodium polyacrylate had water absorption capacities of 8 ml and 9.8 ml after centrifugation with water retention capacities of 61.5% and 97.5% respectively.

Carboxymethyl Cellulose Microstructures.

Figure 21:
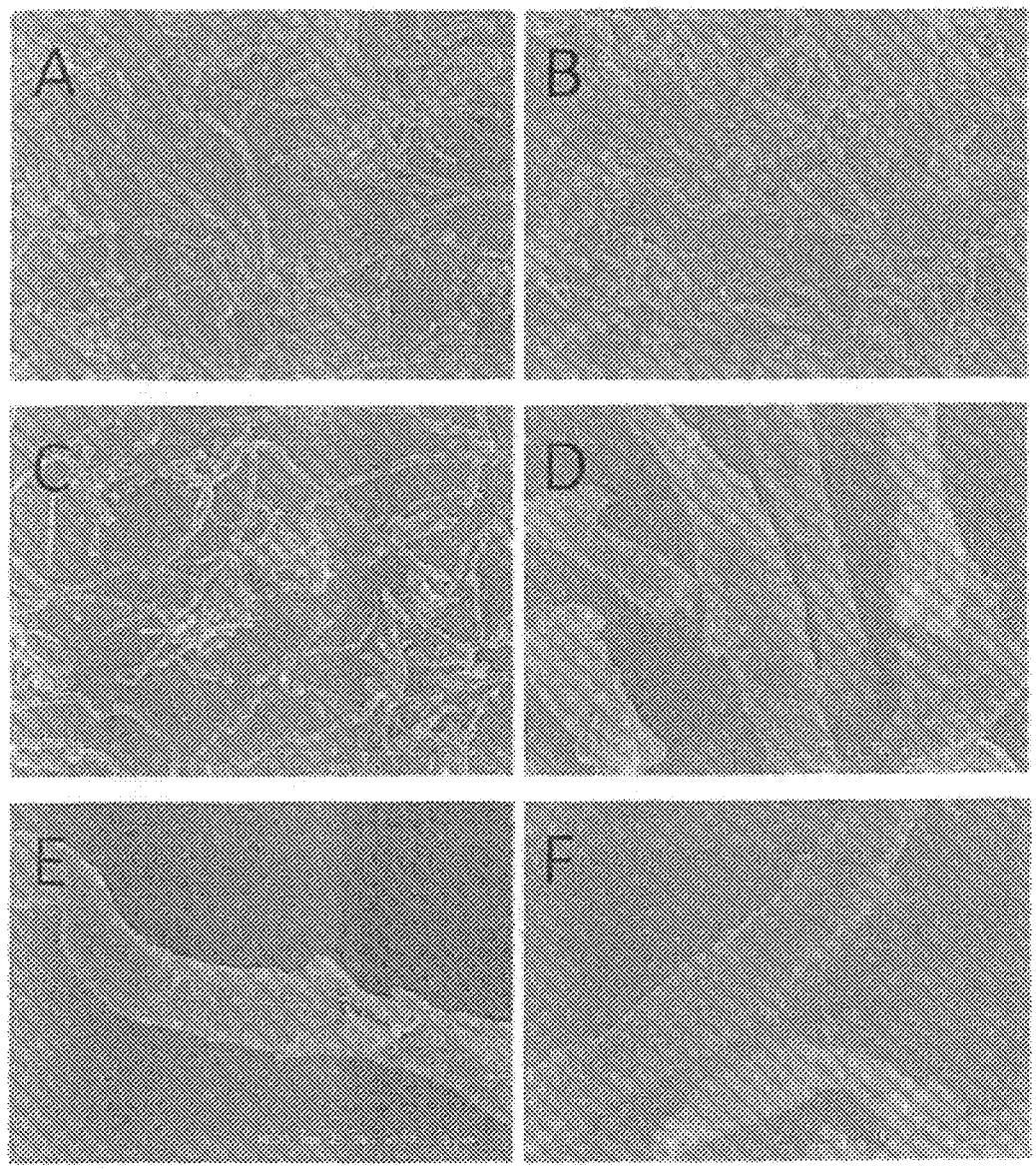
FIG. 21 contains SEM images (120× and 900× magnification) of carboxymethyl cellulose prepared using 10% $H_2O$ and 30 g NaOH (A & D), 40 g NaOH (B & E), and 50 g NaOH (C & F) as disclosed in Example 8, below.
Figure 22:
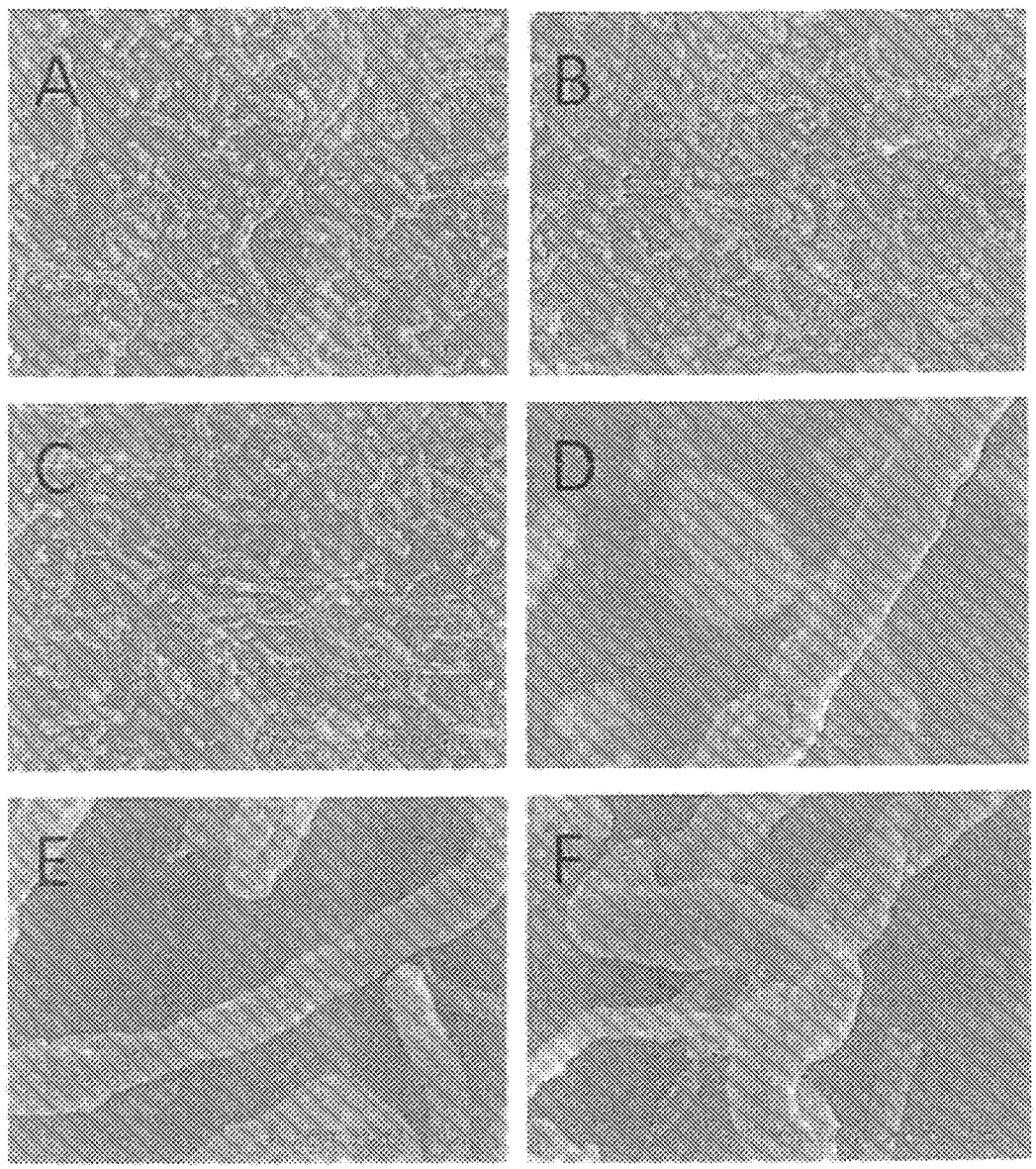
FIG. 22 contains SEM images (120× and 900× magnification) of carboxymethyl cellulose prepared using 100% $H_2O$ and 30 g NaOH (A & D), 40 g NaOH (B & E), and 50 g NaOH (C & F) as disclosed in Example 8, below

FIGS. 21 and 22 illustrate the microstructures of carboxymethyl cellulose, at magnifications of 120× and 900×, prepared with 10% $H_2O$ and 100% $H_2O$ respectively, at all levels of NaOH. From the microstructures of carboxymethyl cellulose for 10% $H_2O$, at 120× magnification, fibers 100 μm to >800 μm in length and 0.8-211 μm in breadth were observed for 50 g NaOH (FIG. 21C), ≤375 μm in length and 1.7-3.3 μm in breadth for 40 g NaOH (FIG. 21B) and ≤440 μm in length and 1.75-3.75 μm in breadth for 30 g NaOH (FIG. 21A) were observed. For 30 g and 40 g NaOH, after purification, extrudates were ground to pass through a 70 mesh screen, whereas for 50 g NaOH, because of the difficulty in size reduction the fraction retained on 70 mesh was also used which explains the longer fiber length. On the other hand, the lower thickness of fibers at 50 g NaOH may have been because of its lower DS (0.1). The microstructure images at 900× magnification reveal some peeling and pitting of the carboxymethyl cellulose surfaces which may have occurred due to mechanical damage during extrusion or during grinding after product purification. No difference could be found between the microstructure of carboxymethyl cellulose prepared using 30 g, 40 g and 50 g NaOH.

Microstructure images of carboxymethyl cellulose, prepared with 100% $H_2O$ (FIG. 22), at 120× magnification exhibit fibers with dimensions≤330 μm and 1.25-2.5 μm (FIG. 22C), ≤430 μm and 1.6-3.3 μm (FIG. 22B), and 670 μm and 1.6-3.3 μm (FIG. 22A) at 50 g, 40 g and 30 g NaOH, respectively. These images also showed some non-fibrous particles, 0.8-6.7 μm in dimensions, likely to have formed during extrudate grinding, after purification. Images at 900× magnification reveal fractured and rough fiber surfaces, similar to those observed in FIG. 21. No difference could be found between the microstructures of carboxymethyl cellulose prepared with 30, 40 and 50 g NaOH at 100% $H_2O$ and also between those prepared with 10% $H_2O$ and 100% $H_2O$ Conclusions.

Carboxymethyl cellulose prepared using 100% $H_2O$, as revealed by x-ray diffraction analysis, had higher degree of crystallinity and fraction of cellulose-II crystalline content than those at lower $H_2O$ contents. The higher crystalline content may have been responsible for the lower DS when 100% $H_2O$ was used as compared to those for lower water contents. The higher rate of liquid-uptake, also, may have resulted from the higher degree of crystallinity. The rate of liquid uptake of carboxymethyl cellulose prepared using 100% $H_2O$ was significantly higher than that of AQUASORB A500. The rapid liquid uptake properties of such carboxymethyl cellulose render them ideal for applications as a super absorbent.

Having illustrated and described the principles of the present invention, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

What is claimed is:

1. A process for the acetylation of a polysaccharide via reactive extrusion to form a polysaccharide acetate, the process comprising:
    (a) forming an extrusion mixture comprising the polysaccharide, acetic anhydride, and iodine, wherein the polysaccharide is selected from the group consisting of a starch and a cellulose, and wherein the extrusion mixture has a weight ratio of acetic anhydride to polysaccharide is in the range from about 0.5 to about 5, and wherein the amount of iodine is in the range from about 0.04 to about 3% by weight of the acetic anhydride;
    (b) feeding the extrusion mixture into an extruder, wherein the extruder has a number of kneading blocks in the range from 1 to 7 and a number of compression screws in the range from 5 to 12; and
    (c) extruding the extrusion mixture to acetylate the polysaccharide and form an extrudate comprising the polysaccharide acetate, wherein the extruding step has a duration in the range from about 2 to about 7 minutes and further comprises maintaining the extruder at a temperature in the range from about 100 to about 190° C., and wherein the polysaccharide acetate has a degree of substitution (DS) in the range from about 0.1 to 1, and wherein the acetylation reaction has a reaction efficiency (RE) that is in the range of about 5% to about 80%.

2. The process of claim 1, wherein:
    the weight ratio of acetic anhydride to polysaccharide is in the range from about 0.75 to about 3, and the amount of iodine is in the range from about 0.1 to about 1% by weight of the acetic anhydride;
    number of extruder kneading blocks is in the range from 2 to 5 and the number of extruder compression screws is in the range from 6 to 9; and
    the extruding step duration is in the range from about 3 to about 4 minutes and the extruder temperature is in the range from about 145 to about 165° C.

3. The process of claim 1, wherein the extruder is a twin-screw extruder having an exit with a cross-sectional area that is at least 80% of the cross-sectional area of the extrusion chamber.

4. The process of claim 1 further comprising grinding the extrudate, washing the ground extrudate with ethanol, water, or both and drying the water-washed extrudate.

5. The process of claim 4, wherein the washing of the ground extrudate further comprises washing with sodium thiosulfate.

6. A process for the acetylation of a polysaccharide via reactive extrusion to form a polysaccharide acetate, the process comprising:
    (a) forming an extrusion mixture comprising the polysaccharide, acetic anhydride, and iodine, wherein the polysaccharide is selected from the group consisting of a starch and a cellulose, and wherein the extrusion mixture has a weight ratio of acetic anhydride to polysaccharide is in the range from about 0.8 to about 6.5, the amount of iodine is in the range from about 0.1 to about 5% by weight of the acetic anhydride;

(b) feeding the extrusion mixture into an extruder, wherein the extruder has a number of kneading blocks in the range from 1 to 7 and a number of compression screws in the range from 5 to 12; and (c) extruding the extrusion mixture to acetylate the polysaccharide and form an extrudate comprising the polysaccharide acetate, wherein the extruding step has a duration in the range from about 2 to about 7 minutes and further comprises maintaining the extruder at a temperature in the range from about 100 to about 190° C., and wherein the polysaccharide acetate has a degree of substitution (DS) that is in the range from about 1 to about 2, and wherein the acetylation reaction has a reaction efficiency (RE) that is in the range of about 5% to about 80%.

7. The process of claim 6, wherein:
the weight ratio of acetic anhydride to polysaccharide is in the range from about 1 to about 4, and the amount of iodine is in the range from about 0.3 to about 2% by weight of the acetic anhydride;
the number of extruder kneading blocks is in the range from 3 to 5 and the number of extruder compression screws is in the range from 7 to 12; and
wherein the extruding step duration is in the range from about 3 to about 6 minutes and the extruder temperature is in the range from about 145 to about 165° C.

8. The process of claim 6, wherein the extruder is a twin-screw extruder having an exit with a cross-sectional area that is at least 80% of the cross-sectional area of the extrusion chamber.

9. The process of claim 6 further comprising grinding the extrudate, washing the ground extrudate with ethanol, water, or both and drying the water-washed extrudate.

10. The process of claim 9, wherein the washing of the ground extrudate further comprises washing with sodium thiosulfate.

11. A process for the acetylation of a polysaccharide via reactive extrusion to form a polysaccharide acetate, the process comprising:

(a) forming an extrusion mixture comprising the polysaccharide, acetic anhydride, and iodine, wherein the polysaccharide is selected from the group consisting of a starch and a cellulose, and wherein the extrusion mixture has a weight ratio of acetic anhydride to polysaccharide is in the range from about 1.25 to about 8, the amount of iodine is in the range from about 0.2 to about 5% by weight of the acetic anhydride, (b) feeding the extrusion mixture into an extruder, wherein the extruder has a number of kneading blocks in the range from 1 to 7 and a number of compression screws in the range from 5 to 12; and (c) extruding the extrusion mixture to acetylate the polysaccharide and form an extrudate comprising the polysaccharide acetate, wherein the extruding step has a duration in the range from about 2 to about 7 minutes and further comprises maintaining the extruder at a temperature in the range from about 100 to about 190° C., and wherein polysaccharide acetate has a degree of substitution (DS) that is in the range from about 2 to 3, and wherein the acetylation reaction has a reaction efficiency (RE) that is in the range of about 5% to about 80%.

12. The process of claim 11, wherein:
the weight ratio of acetic anhydride to polysaccharide is in the range from about 1.5 to about 5, and the amount of iodine is in the range from about 0.5 to about 3% by weight of the acetic anhydride;
the number of extruder kneading blocks is in the range from 3 to 6 and the number of extruder compression screws is in the range from 8 to 12; and
the extruding step duration is in the range from about 4 to about 7 minutes and the extruder temperature is in the range from about 155 to about 175° C.

13. The process of claim 11, wherein the extruder is a twin-screw extruder having an exit with a cross-sectional area that is at least 80% of the cross-sectional area of the extrusion chamber.

14. The process of claim 11 further comprising grinding the extrudate, washing the ground extrudate with ethanol, water, or both and drying the water-washed extrudate.

15. The process of claim 14, wherein the washing of the ground extrudate further comprises washing with sodium thiosulfate.

* * * * *